US010078820B2

(12) United States Patent
Renke et al.

(10) Patent No.: US 10,078,820 B2
(45) Date of Patent: Sep. 18, 2018

(54) SPLIT TICKET HANDLING

(71) Applicant: Square, Inc., San Francisco, CA (US)

(72) Inventors: Christopher Philip Renke, San Francisco, CA (US); Justin Brunet, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/985,528

(22) Filed: Dec. 31, 2015

(65) Prior Publication Data

US 2017/0193488 A1 Jul. 6, 2017

(51) Int. Cl.
| | |
|---|---|
| *G06Q 20/08* | (2012.01) |
| *G06Q 20/04* | (2012.01) |
| *G06Q 20/32* | (2012.01) |
| *G06Q 20/20* | (2012.01) |

(52) U.S. Cl.
CPC ......... *G06Q 20/085* (2013.01); *G06Q 20/045* (2013.01); *G06Q 20/209* (2013.01); *G06Q 20/322* (2013.01)

(58) Field of Classification Search
CPC .. G06Q 20/322; G06Q 20/209; G06Q 20/085; G06Q 20/045
See application file for complete search history.

(56) References Cited

U.S. PATENT DOCUMENTS

| | | | |
|---|---|---|---|
| 5,664,110 A | 9/1997 | Green et al. | |
| 7,117,183 B2 | 10/2006 | Blair et al. | |
| 7,257,547 B1 | 8/2007 | Terase | |
| 7,835,990 B2 | 11/2010 | Coleman | |
| 8,028,896 B2 | 10/2011 | Carter et al. | |
| 8,370,207 B2 | 2/2013 | Edwards | |
| 8,498,900 B1 | 7/2013 | Spirin et al. | |
| 8,769,304 B2 | 7/2014 | Kirsch | |
| 8,831,677 B2 | 9/2014 | Villa-Real | |
| 9,218,413 B2 | 12/2015 | Skeen et al. | |
| 9,569,757 B1 | 2/2017 | Wilson et al. | |
| 9,674,669 B2 | 6/2017 | Subramanian et al. | |
| 9,807,086 B2 | 10/2017 | Nordstrom et al. | |
| 9,875,469 B1 * | 1/2018 | Chin | G06Q 20/14 |
| 9,928,489 B2 * | 3/2018 | Ohnishi | G06Q 20/102 |
| 2002/0092912 A1 | 7/2002 | Hamilton et al. | |

(Continued)

FOREIGN PATENT DOCUMENTS

| | | |
|---|---|---|
| WO | 2016/168298 A2 | 10/2016 |
| WO | 2017/116610 A1 | 7/2017 |

OTHER PUBLICATIONS

Final Office Action dated Sep. 27, 2016, for U.S. Appl. No. 14/686,381 of Renke, C.P., et al., filed Apr. 14, 2015.

(Continued)

*Primary Examiner* — Asfand M Sheikh
(74) *Attorney, Agent, or Firm* — Lee & Hayes, PLLC

(57) ABSTRACT

This disclosure describes techniques and arrangements for splitting one or more items from a ticket to another ticket. Some techniques and arrangements facilitate the splitting of one or more items from an open ticket to one or more split tickets. In some implementations, a foster ticket is utilized to account for items associated with split tickets. Other techniques and arrangements include providing split ticket suggestions. In some implementations, split ticket suggestions are provided based on historical ticket information and/or customer information.

20 Claims, 17 Drawing Sheets

(56) References Cited

U.S. PATENT DOCUMENTS

| | | |
|---|---|---|
| 2003/0046166 A1 | 3/2003 | Liebman |
| 2003/0050854 A1 | 3/2003 | Showghi et al. |
| 2004/0054592 A1 | 3/2004 | Hernblad |
| 2004/0143512 A1 | 7/2004 | Sturr, Jr. |
| 2005/0071232 A1* | 3/2005 | Frater ............... G06Q 20/04 705/16 |
| 2005/0108116 A1* | 5/2005 | Dobson ............... G06Q 40/12 705/30 |
| 2006/0255128 A1 | 11/2006 | Johnson et al. |
| 2009/0037286 A1* | 2/2009 | Foster ............... G06Q 20/20 705/21 |
| 2012/0166332 A1* | 6/2012 | Naaman ............... G06Q 30/04 705/40 |
| 2012/0173396 A1* | 7/2012 | Melby ............... G06Q 30/04 705/34 |
| 2013/0204718 A1 | 8/2013 | Freeman |
| 2014/0164234 A1* | 6/2014 | Coffman ............... G06Q 20/14 705/40 |
| 2014/0279098 A1* | 9/2014 | Ham ............... G06Q 20/102 705/16 |
| 2014/0330654 A1 | 11/2014 | Turney et al. |
| 2014/0365286 A1 | 12/2014 | Samoville |
| 2015/0039450 A1 | 2/2015 | Hernblad |
| 2015/0120344 A1 | 4/2015 | Rose |
| 2015/0134441 A1 | 5/2015 | Balar et al. |
| 2015/0235254 A1 | 8/2015 | Carroll-Boser et al. |
| 2015/0310408 A1* | 10/2015 | Anderson ............... G06Q 20/14 705/39 |
| 2015/0324937 A1 | 11/2015 | Callahan |
| 2016/0267448 A1 | 9/2016 | James et al. |
| 2016/0292677 A1* | 10/2016 | Karlsson ............... G06Q 20/20 |
| 2016/0307176 A1 | 10/2016 | Renke et al. |
| 2017/0193470 A1 | 7/2017 | Renke et al. |

OTHER PUBLICATIONS

Notice of Allowance dated Jun. 29, 2016, for U.S. Appl. No. 14/871,776, of Wilson, M., et al., filed Sep. 30, 2015.
Non-Final Office Action dated Jul. 30, 2015, for U.S. Appl. No. 14/686,381 of Renke, C. P., et al., filed Apr. 14, 2015.
Final Office Action dated Nov. 10, 2015, for U.S. Appl. No. 14/686,381 of Renke, C., et al., filed Apr. 14, 2015.
Non-Final Office Action dated Dec. 17, 2015, for U.S. Appl. No. 14/871,776 of Wilson, M., et al., filed Sep. 30, 2015.
Advisory Action dated Jan. 22, 2016, for U.S. Appl. No. 14/686,381 of Renke, C. R, et al., filed Apr. 14, 2015.
Non-Final Office Action dated Apr. 8, 2016, for U.S. Appl. No. 14/686,381 of Renke, C. P., et al., filed Apr. 14, 2015.
Non-Final Office Action dated Jun. 12, 2017, for U.S. Appl. No. 15/253,172, of Wilson, M., et al., filed Aug. 31, 2016.
International Search Report and Written Opinion for International Patent Application No. PCT/US2016/064710, dated May 11, 2017.
International Search Report and Written Opinion for International Patent Application No. PCT/US2016/027288, dated Sep. 30, 2016.
Notice of Allowance dated Dec. 1, 2017, for U.S. Appl. No. 15/253,172, of Wilson, M., et al., filed Aug. 31, 2016.
Non-Final Office Action dated Jan. 17, 2018, for U.S. Appl. No. 14/871,714, of Wilson, M., et al., filed Sep. 30, 2015.
Non-Final Office Action dated Jan. 26, 2018, for U.S. Appl. No. 14/686,381, of Renke, C.P., et al., filed Apr. 14, 2015.
Notice of Allowance dated Aug. 4, 2017, for U.S. Appl. No. 14/686,381, of Renke, C.P., et al., filed Apr. 14, 2015.

\* cited by examiner

SPLIT TICKET HANDLING

BACKGROUND

Typical point-of-sale (POS) devices used by merchants create relatively simple tickets that document items ordered by customers and payment instruments used by the customers to pay for their items. Typically, an example ticket would track the items ordered by a customer, the cost of the items, and how the customer paid for these items. While these traditional tickets are effective at ensuring that a customer receives what she orders—and is charged as such—the traditional tickets, and the POS devices that provide them, perform very limited functionality.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
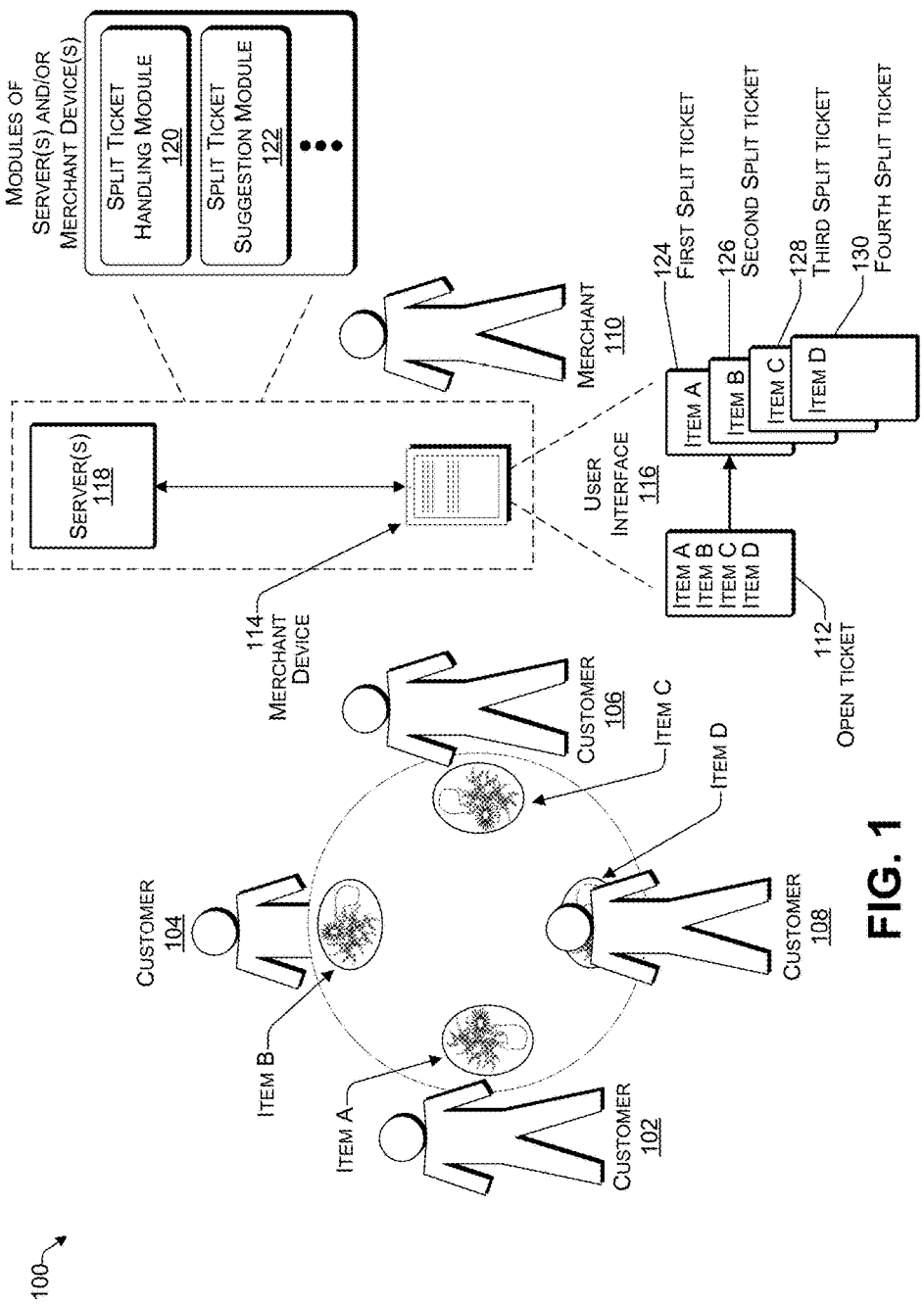
FIG. 1 is a schematic diagram illustrating an example scenario that provides context for the discussion of various scenarios with respect to FIGS. 2A-2E.
Figure 2A:
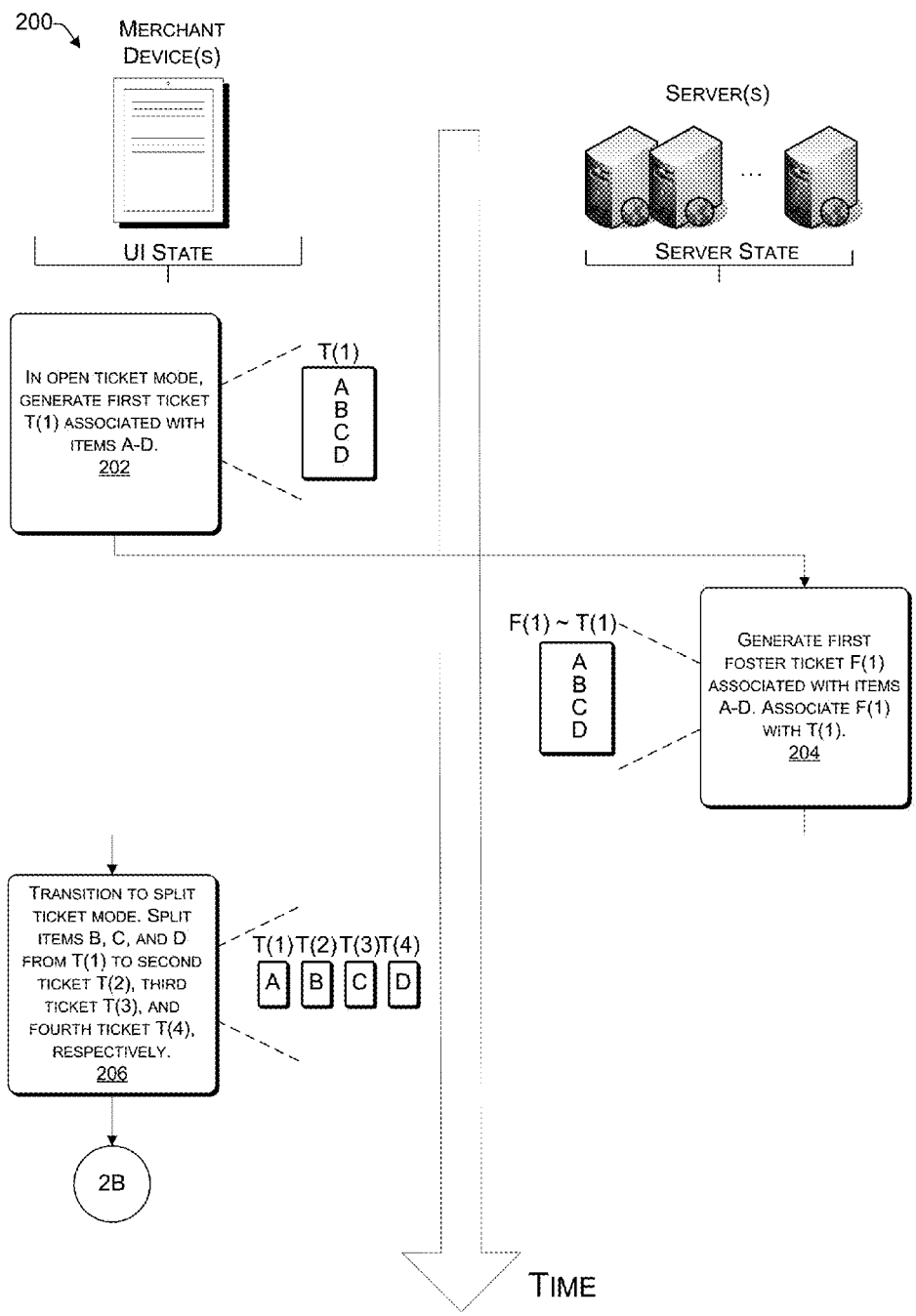
FIGS. 2A-2E show a schematic diagram illustrating an example process for handling split tickets in accordance with some implementations. The example process illustrates a user interface (UI) state of tickets and a server state of tickets.
Figure 2B:
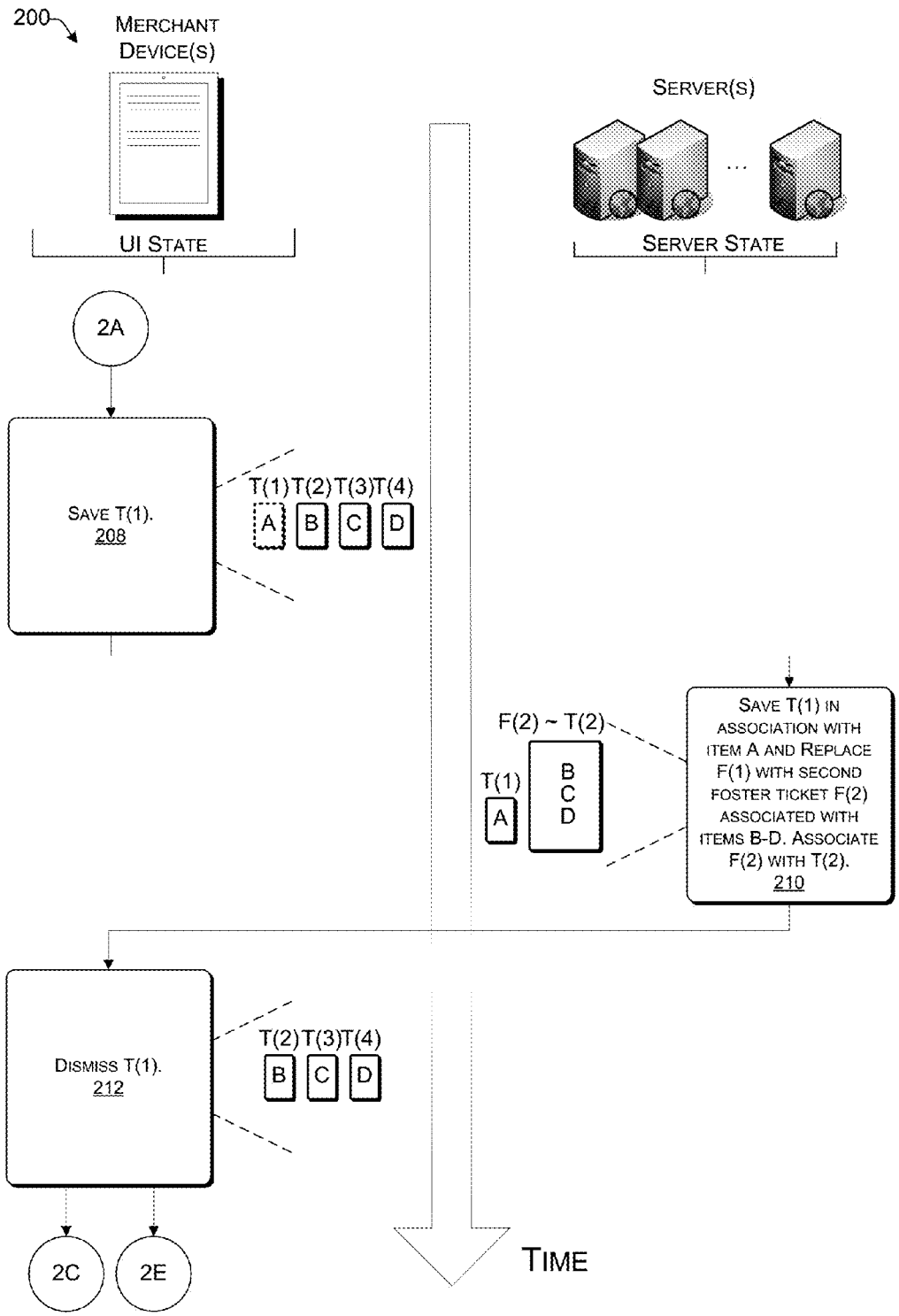
Figure 2C:
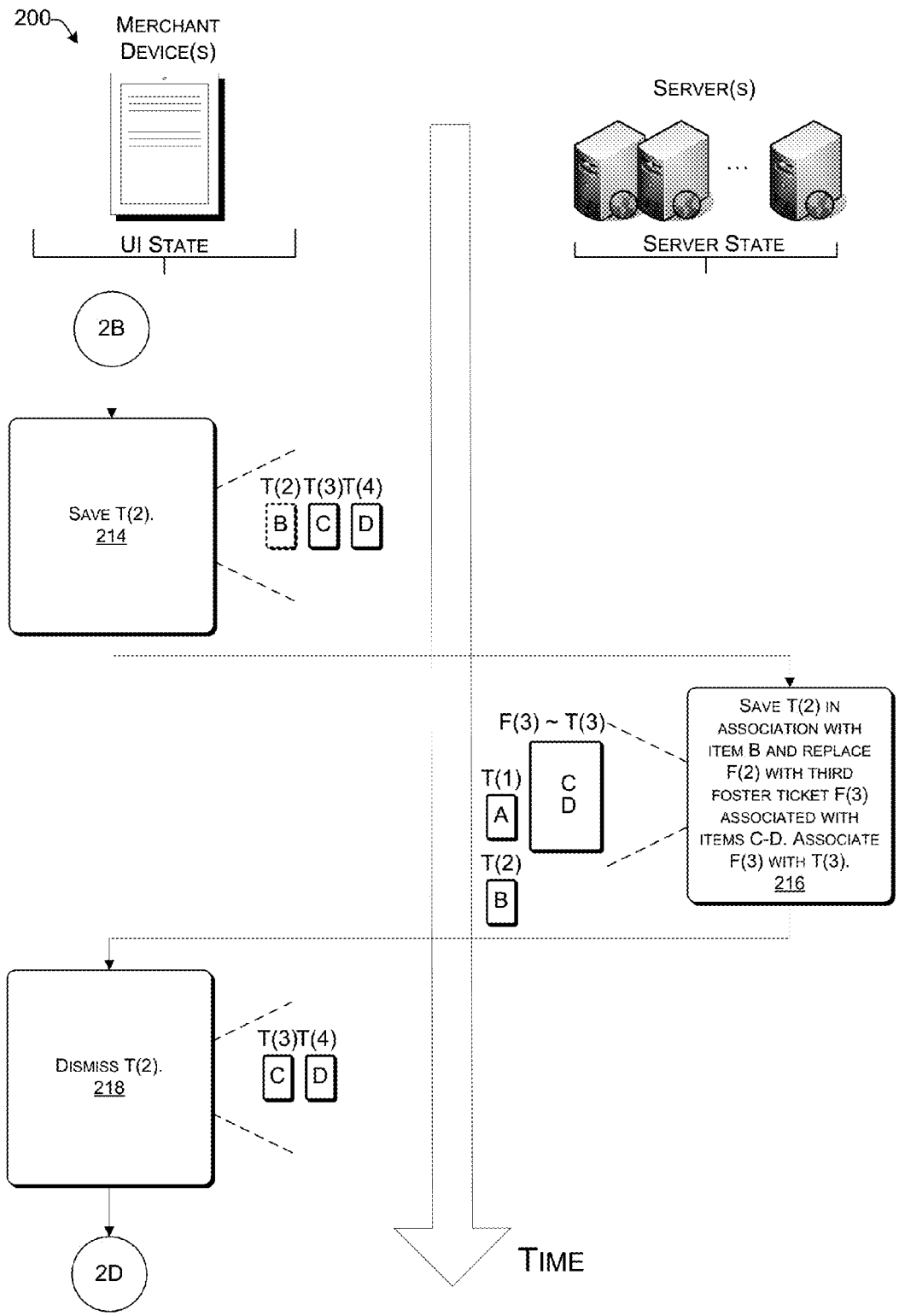
Figure 2D:
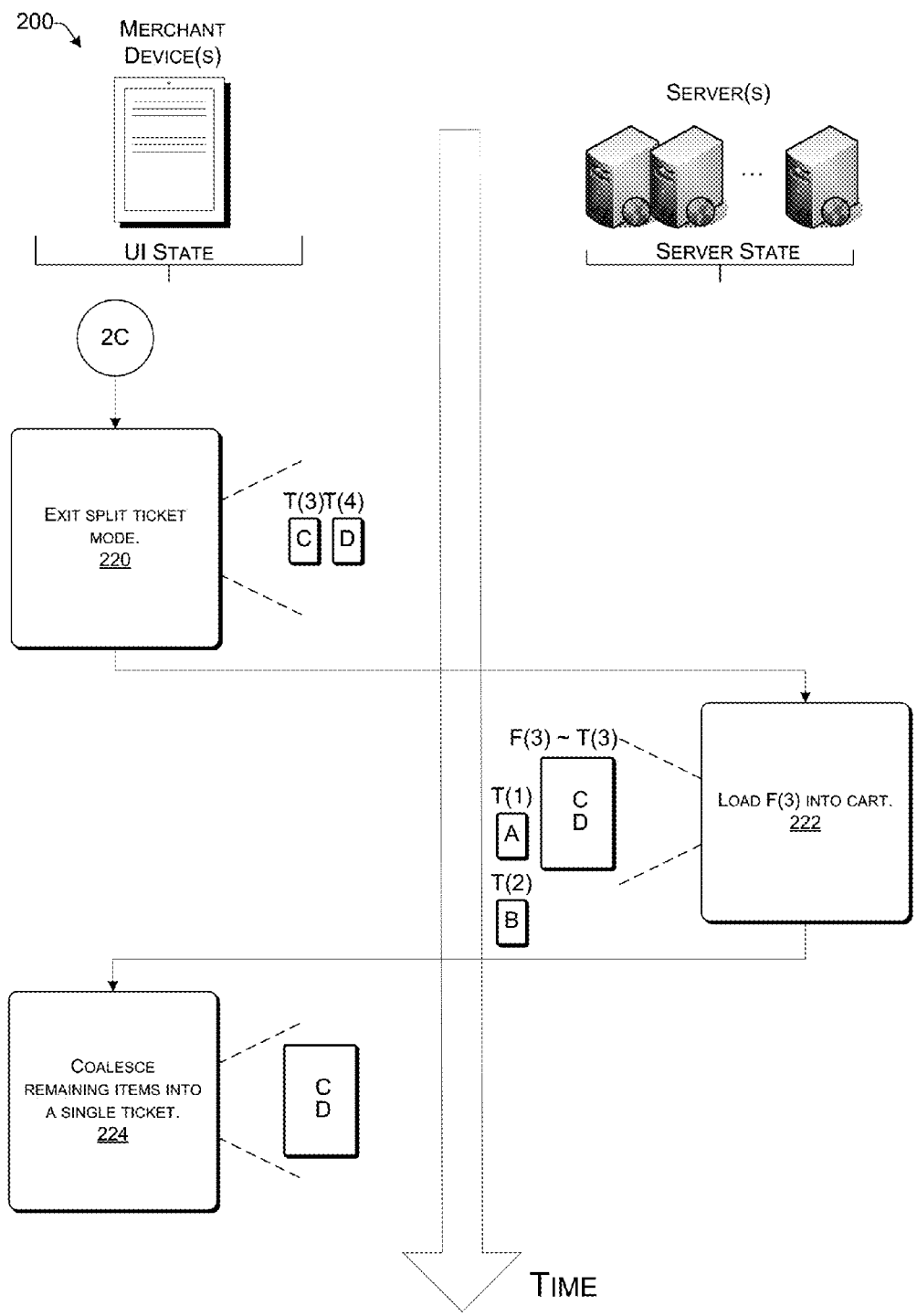
Figure 2E:
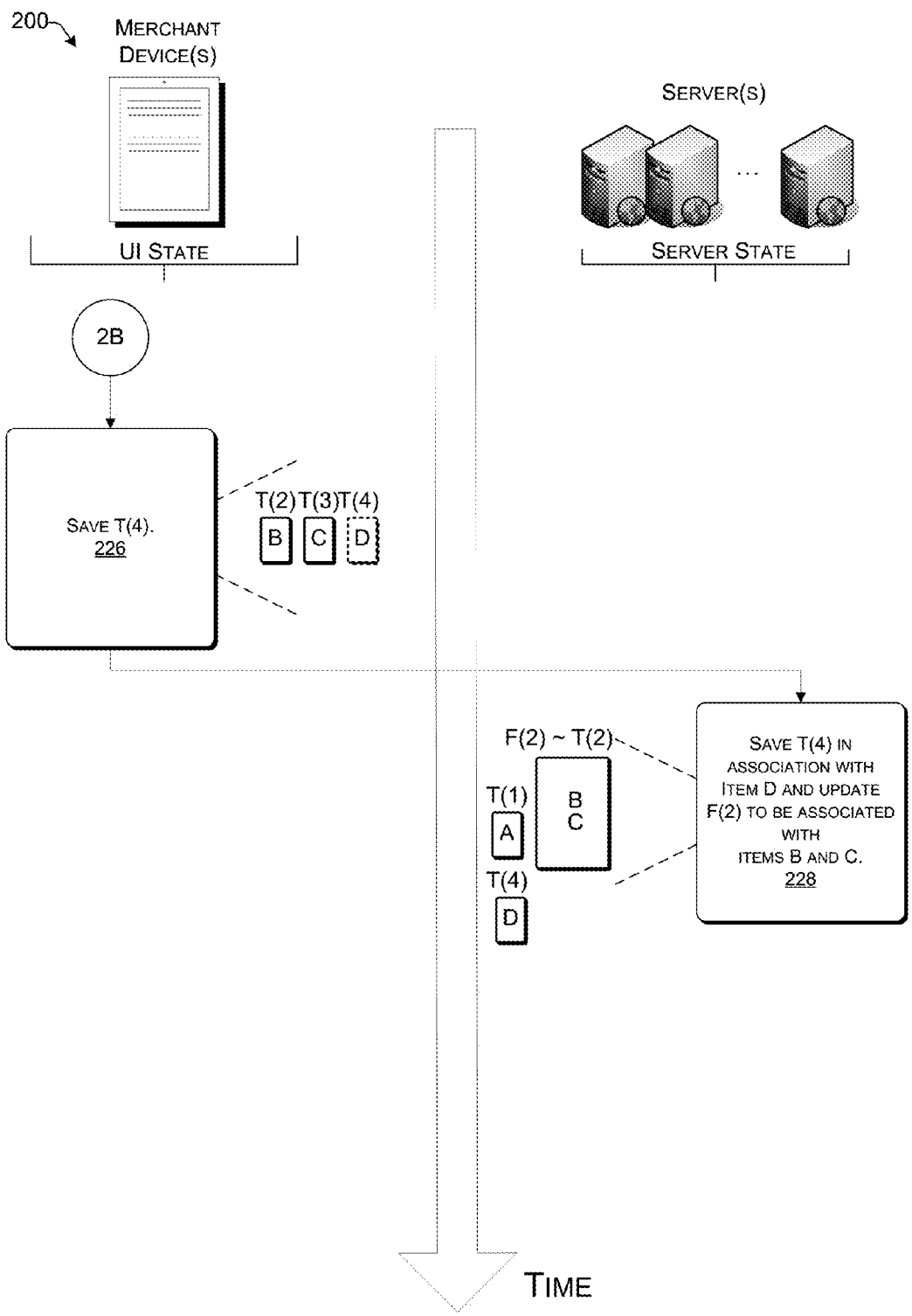

This disclose describes, in part, techniques and arrangements for splitting one or more items from a merchant ticket to one or more other merchant tickets. Some implementations described herein include techniques and arrangements for making suggestions with respect to ticket splitting.

In a non-limiting example scenario, a group of customers may order menu items (e.g., food, drinks, etc.) at a restaurant. The waiter attending to the customers may use a point-of-sale (POS) device to generate a ticket that tracks the items ordered by the customers. When the customers finish their meal, the waiter may ask the customers whether they would like to pay on a single check or on separate checks. The customers may choose to split the check in whatever manner suits them. For example, the customers may want to split the check such that each can pay for the respective items they ordered. In another example, a group of four customers consisting of two couples may want to split the check into two checks in accordance with the items ordered by each couple. The waiter may use the POS device to split the ticket into two or more tickets. That is, one or more items of the original ticket may be split from the original ticket to one or more other tickets (e.g., one or more new, "split tickets").

The POS device may communicate with one or multiple servers. For example, a server (or other type of computing device) of a payment processor may be configured to, among other things, process payments for multiple merchants including the restaurant merchant of this illustrative example scenario. The server may additionally or alternatively be configured to facilitate the handling of split tickets as described herein. The POS device and the server may communicate to cooperatively track various aspects of tickets (including split tickets), such as items, customers, costs, etc. associated with each ticket.

In some instances, tickets described herein may be known as open tickets, which record interactions between customers and merchants. For instance, when a particular customer from a group orders an item from the merchant, the merchant may add this item to the open ticket. When another customer from the group orders another item from the merchant, the merchant may likewise add this item to the open ticket, and may continue doing so until the group has finished ordering items. That is, open tickets track interactions of a customer (or multiple customers part of a common group at the merchant) and a merchant over time. These interactions include items ordered, tenders used, notes added by the merchant, and tags selected by the merchant, as well as timing information noting when each of these events occurred. As such, the open tickets serve as a canonical representation of a transaction between the customer and the merchant. When one or more customers provide payment (i.e., tenders) to the merchant, the merchant may note the tender(s) used on the open ticket to settle the cost of the ordered items.

In some instances, an open ticket may be created prior the customer even arriving at a merchant. For instance, a merchant may create an open ticket upon a customer requesting to create a reservation with the merchant at a specified future time. That is, in response to receiving such a request, a device of the merchant may generate an open ticket that will later be used by the merchant to track interactions with the customer at the specified future time, such as the items ordered by the customer, the tenders used by the customer, and the like. By doing so, each interaction between the customer and the merchant from the time that the customer first expressed an interest in patronizing the merchant (i.e., when the customer requested to create a reservation) to the time at which the customer closes the transaction with the merchant (i.e., when the customer pays and/or when the last item is delivered to the customer) may be noted for subsequent analysis.

In some implementations, a user interface (UI) presented on a display of the POS device may include a visual representation of a ticket. The state of a ticket on the POS device and/or the UI of the POS device may be referred to herein as a "UI state" of the ticket. Likewise, the state of a ticket on the server may be referred to herein as a "server state" of the ticket.

As will be described in further detail below, the POS device and/or the UI of the POS device may be operable in an open ticket mode to generate an open ticket. In some examples, the UI of the POS device may present an option for switching or transitioning from the open ticket mode to a split ticket mode. In the split ticket mode, the open ticket may be split into multiple tickets. The POS device may receive inputs that cause manipulation of a ticket. For example, a merchant may use the POS device to manipulate (e.g., save, cancel, split, add item(s) to, remove item(s) from, add customer to, remove customer from, etc.) an open ticket while operating the POS device in the open ticket mode and/or to manipulate a split ticket while operating the POS device in the split ticket mode.

In some examples, the POS device may track and/or store the UI state of one or more tickets in a memory of the POS device. The POS device may communicate with the server based at least in part on actions performed at the POS device with respect to a ticket. For instance, the server may, in response to receiving an indication that the ticket has been manipulated at the POS device, initiate or update the server state of the manipulated ticket and/or the server state of another ticket that is associated with the manipulated ticket.

In various implementations, the server may generate one or more foster tickets. As described herein, a foster ticket may be a ticket at the server used to track ticket information associated with one or more tickets at the POS device. For instance, the foster ticket may be used to account for items and/or tickets that are capable of being manipulated via the POS device.

In another non-limiting example scenario, a POS device associated with a merchant may generate an open ticket for multiple items ordered by a customer. The open ticket may be generated using the open ticket mode of the POS device. The multiple items of the open ticket may include a first item and a second item. Then, the POS device may be transitioned from the open ticket mode to the split ticket mode. While in the split ticket mode, the second item may be split from the open ticket to a new, split ticket. At this point, the UI state may include the open ticket as a first ticket and the split ticket as a second ticket, where the first ticket includes the first item and the second ticket includes the second item.

As will be discussed in further detail below, various information associated with the tickets may be logged. For instance, a parent-child relationship may be established between the first ticket in the second ticket, where the first ticket is a parent of the second ticket, and the second ticket is a child of the first ticket. The POS device and/or the server may log parent-child relationship between tickets. Additionally or alternatively, the POS device and/or the server may log events associated with the tickets. For instance, the POS device and/or the server may keep an event log that records events such as, but not limited to, the splitting of the second item from the first ticket to the second ticket. The POS device and/or the server may, in some cases, log information in a single log file or in multiple log files. In some cases, the logged information may be used to trace the UI state and/or the server state forwards or backwards to respond to actions that may have a dependency on the history of a ticket, such as reverting to a previous ticket state when a ticket split is canceled.

Meanwhile, the server state may include a first foster ticket associated with items available in the UI state, including the first item and the second item. In various implementations, the first foster ticket may be associated with the original open ticket (i.e., the first ticket in this example). For instance, the first foster ticket and the first ticket may be associated by way of a same identifier (ID).

Continuing with the illustrative example discussed immediately above, the first ticket may be saved at the POS device. The POS device may save the first ticket in association with the first item and/or send a request to the server to save the first ticket in association with the first item. Furthermore, the POS device may dismiss the first ticket from the UI presented on the display of the POS device. That is, the first ticket may be removed from the UI of the POS device, leaving the second ticket remaining in the UI. Because the first foster ticket is associated with the first ticket, and the first ticket has been dismissed from the UI of the POS device, the server may replace the first foster ticket with a second foster ticket that accounts for the items that are remaining in the UI of the POS device. The second foster ticket may be associated with the second ticket and with the items that are remaining in the UI of the POS device, including the second item.

Additionally or alternatively, the server and/or the POS device may be configured to provide intelligent suggestions with respect to ticket splitting. For example, the server may receive ticket information from POS devices associated with multiple merchants. The ticket information may be associated with tickets generated at least partly via the POS devices. The server may utilize this ticket information to provide ticket splitting suggestions to the POS device.

In some cases, the ticket splitting suggestions may be based at least in part on relationships between items and/or types of items. For instance, the server may determine, based at least in part on the ticket information, that a number of tickets include an order of fries along with an order of a hamburger. The server may store a flag associated with a hamburger type of item and fries type of item. The server may receive a list of items associated with an open ticket generated by a POS device associated with one of the merchants. The list of items may include an order of a hamburger and an order of fries along with other items. The server may determine that the hamburger item of the open ticket is of the flagged hamburger type. Similarly, the server may determine that the fries item of the open ticket is of the flagged fries type. As a result, the server may send a split ticket suggestion to the POS device. The split ticket suggestion may cause the POS device to suggest (e.g., via the UI) to split the hamburger item and the fries item from the open ticket to a new, split ticket.

In some instances, the ticket splitting suggestions may additionally or alternatively be based at least in part on relationships between customers and items (and/or types of items). For example, the server may determine, based at least in part on the ticket information received from the POS devices associated with multiple merchants, that a particular customer has ordered a first type of item and a second type of item together in a number of tickets. As such, the server may associate the customer with the first type of item and the second type of item. The server may receive a list of items associated with an open ticket generated by a POS device associated with one of the merchants. The list of items may include a first item and a second item. The open ticket and/or the list of items may indicate an association between the first item and the customer, and an association between the second item and the customer. The server may determine that the first item is of the first type of item associated with the customer, and that the second item is of the second type of item associated with the customer. As a result, the server may send a split ticket suggestion to the POS device. The split ticket suggestion may cause the POS device to suggest (e.g., via the UI) to split the first item and the second item from the open ticket to a new, split ticket.

The foregoing example techniques and arrangements for making suggestions with respect to ticket splitting are non-limiting and are merely provided for illustrative purposes. Various implementations, including those discussed below with reference to the figures, may include additional or alternative techniques and/or arrangements for making ticket splitting suggestions.

As used herein, a merchant may include any business engaged in the offering of goods or services for acquisition by customers. Actions attributed to a merchant may include actions performed by owners, employees, or other agents of the merchant, and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items. Thus, a merchant (or an employee of the merchant) and a customer may interact with each other to conduct a transaction in which the customer acquires an item from the merchant, and in return, the customer provides payment to the merchant.

As used herein, a transaction may include a financial transaction for the acquisition of goods and/or services that is conducted between a customer and a merchant (or an employee of the merchant). For example, when paying for a transaction, the customer can provide the amount that is due to the merchant using cash or other payment instrument (e.g., a debit card, a credit card, a stored-value or gift card, a check, through an electronic payment application on a device carried by the customer, or the like). The merchant can interact with a merchant device, such as a POS device, to process the transactions, such as by inputting (e.g., manually, via a magnetic card reader or an RFID reader, etc.) identifiers associated with the payment instruments. For example, a payment instrument of the customer may include one or more magnetic strips for providing card and customer information when swiped in a card reader. In other examples, other types of payment cards may be used, such as smart cards having a built-in memory chip that is read by the merchant device when the card is "dipped" into the reader, a radiofrequency identification tag, or so forth.

For discussion purposes, some example implementations are described below with reference to the corresponding figures. However, implementations herein are not limited to the particular examples provided, and may be extended to other environments, other system architectures, other types of merchants, and so forth, as will be apparent to those of skill in the art in light of the disclosure herein.

FIG. 1 is a schematic diagram illustrating an example scenario 100 that provides context for the discussion of various scenarios with respect to FIGS. 2A-2E. In particular, FIG. 1 is an illustration of an example scenario 100 occurring at a restaurant in which open ticket transactions and ticket splitting may be performed.

Customers 102-108 are at the restaurant. A merchant 110 (e.g. a member of the service personnel of the restaurant) is serving the customers 102-108 at the restaurant. The customers 102-108 may order menu items by requesting them from the merchant 110. In the example scenario 100, customer 102 orders item A, customer 104 orders item B, customer 106 orders item C, and customer 108 orders item D. The merchant 110 creates an open ticket 112 for items requested by the customers 102-108 using a merchant device 114. A visual representation of the open ticket 112 may be provided to the merchant 110 via a user interface 116 presented on a display of the merchant device 114. The merchant device 114 may communicate with one or more servers 118 to perform various functions associated with tickets, including the generation and handling of open tickets and split tickets.

As will be discussed in further detail below, the merchant device 114 and/or the server 118 may include a split ticket handling module 120 and/or a split ticket suggestion module 122. The split ticket handling module 120 may function to facilitate the handling of split tickets. The split ticket suggestion module 122 may function to provide suggestions for splitting tickets.

When the customers 102-108 finish their meal, the merchant 110 may ask the customers 102-108 whether they would like to pay on a single check or on separate checks. The customers 102-108 may choose to split the check in whatever manner suits them. For example, the customers may want to split the check such that each can pay for the respective items they ordered. That is, customer 102 may want to pay for item A only, customer 104 may want to pay for item B only, customer 106 may want to pay for item C only, and customer 108 may want to pay for item D only. Accordingly, the merchant 110 may operate the merchant device 114 to split items from the open ticket 112 to split tickets. As depicted, item A is allocated to first split ticket 124, item B is allocated to second split ticket 126, item C is allocated to third split ticket 128, and item D is allocated to fourth split ticket 130. In various implementations, the first split ticket 124 may be the original open ticket 112. In other words, items B-D may be split from the open ticket 112 to new split tickets, while item A may remain on open ticket 112, which may also be considered a split ticket.

FIGS. 2A-2E show a schematic diagram illustrating an example process 200 for handling split tickets in accordance with some implementations. The example process 200 illustrates a user interface (UI) state of tickets and a server state of tickets.

At 202, the process 200 may generate a first ticket T(1) associated with items A-D. For instance, the first ticket T(1) may be an open ticket generated by a merchant device while operating in an open ticket mode. A visual representation of the first ticket T(1) may be presented via a UI of the merchant device. In some implementations, data structures corresponding to tickets that are presented via the UI, such as the first ticket T(1) may be stored in a memory of the merchant device.

At 204, the process 200 may generate a first foster ticket F(1) associated with items A-D. The first foster ticket F(1) may be associated with the first ticket T(1). In some implementations, the first foster ticket F(1) may be generated by the server(s) at least partly in response to being notified of the generation of the first ticket T(1). In other implementations, the first foster ticket F(1) may not be generated until after being notified of a split ticket action taken with respect to the first ticket T(1). In some cases, the first foster ticket F(1) may be the first ticket T(1) designated as the first foster ticket F(1). In other cases, the first ticket T(1) and the first foster ticket F(1) may be separate entities, and may be treated as such by the server(s). The server(s) may use foster tickets to account for items and/or tickets at merchant device(s).

At 206, the process 200 may transition the merchant device(s) from the open ticket mode to a split ticket mode. Items B, C, and D may be split from the first ticket T(1) to a second ticket T(2), a third ticket T(3), and a fourth ticket T(4), respectively. Item A may remain on the first ticket T(1). At this point, the first ticket T(1) may be stored in a memory of the merchant device(s) in association with item A while the update to the first ticket T(1) may not yet be stored in the server(s).

At 208, the process 200 may save the first ticket T(1). For instance the merchant device(s) may receive, via the UI, one or more inputs that correspond to a save of the first ticket T(1). In some implementations, certain other inputs and/or actions may cause a save or provide an effect that is the same as, or similar to, a save of a ticket. For example, in some cases, an input corresponding to a print of a ticket may cause the ticket to be saved.

At 210, the process 200 may save the first ticket T(1) in association with item A and replace the first foster ticket F(1) with a second foster ticket F(2) associated with items B-D. The second foster ticket F(2) may be associated with the second ticket T(2). For instance, the server(s) may save the first ticket T(1) in association with item A in response to being notified of the save of the first ticket T(1) at the merchant device(s).

The server(s) may replace the first foster ticket F(1) because the first foster ticket F(1) was associated with the first ticket T(1), which has been saved. The server(s) may generate the second foster ticket F(2) to account for the items remaining in the UI of the merchant device(s) and/or the tickets remaining in the UI of the merchant device(s), specifically, items B-D. In some implementations, foster tickets are associated with the lowest ordinal ticket remaining in the UI of the merchant device(s). At this point in the process 200, the lowest ordinal ticket remaining in the UI of the merchant device(s) is the second ticket T(2). Accordingly, the second foster ticket F(2) is associated with the second ticket T(2). In some examples, the second foster ticket F(2) may include an identifier that is correlated with an identifier of the second ticket T(2).

At 212, the process 200 may dismiss the first ticket T(1) from the UI of the merchant device(s). For example, the visual representation of the first ticket T(1) may no longer be presented via the UI of the merchant device(s).

At 214, the process 200 may save the second ticket T(2). For instance, the merchant device(s) may receive, via the UI, one or more inputs that correspond to a save of the second ticket T(2).

At 216, the process 200 may save the second ticket T(2) in association with item B and replace the second foster ticket F(2) with a third foster ticket F(3) associated with items C-D. The third foster ticket F(3) may be associated with the third ticket T(3). For instance, the server(s) may save the second ticket T(2) in association with item B in response to being notified of the save of the second ticket T(2) at the merchant device(s). At this point in the process 200, the lowest ordinal ticket remaining in the UI of the merchant device(s) is the second ticket T(2). Accordingly, the second foster ticket F(2) is associated with the second ticket T(2).

At 218, the process 200 may dismiss the second ticket T(2) from the UI of the merchant device(s). For example, the visual representation of the second ticket T(2) may no longer be presented via the UI of the merchant device(s).

At 220, the process 200 may exit the split ticket mode. For example, the merchant device(s) may receive, via the UI, one or more inputs corresponding to an exit of the split ticket mode.

At 222, the process 200 may load the third foster ticket F(3) into the cart. At 224, the process 200 may coalesce the remaining items, items C-D, into a single ticket.

Referring back to the dismissal of the first ticket T(1), at 212, which leaves items B, C, and D on tickets T(2), T(3), and T(4), respectively, the process 200 may continue by saving the fourth ticket T(4), at 226. For instance, the merchant device(s) may receive, via the UI, one or more inputs that correspond to a save of the fourth ticket T(4).

At 228, the process 200 may save the fourth ticket T(4) in association with item D and update the second foster ticket F(2) to be associated with items B-C. The second foster ticket F(2) may maintain its association with the second ticket T(2) because the second ticket T(2) remains in the UI of the merchant device(s).

Figure 3A:
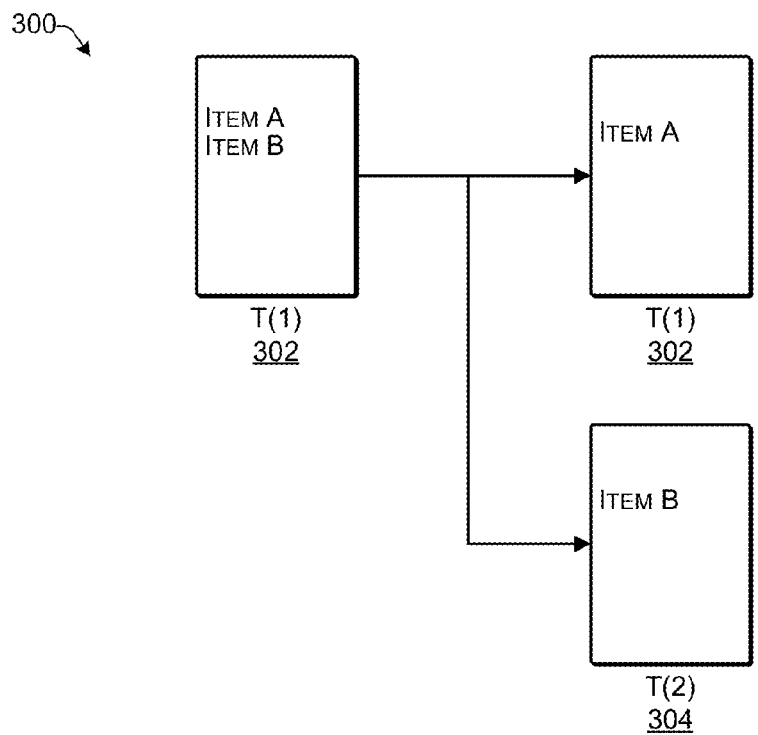
FIG. 3A is a block diagram illustrating an example of splitting an item by type from a first ticket to a second ticket.

FIG. 3A is a block diagram illustrating an example of splitting an item by type from a first ticket T(1) 302 to a second ticket T(2) 304. The first ticket 302 may include multiple items of different types. For instance, the first ticket 302 may include item A and item B. Item B may be split from the first ticket 302 to a second ticket 304, and item A may remain on the first ticket 302. A parent-child relationship between the first ticket 302 and the second ticket 304 may be established. For instance, the merchant device(s) and/or the server(s) described herein may log the parent-child relationship. Additionally or alternatively, a parent-child relationship may be established between item A and item B may, which may logged by the merchant device(s) and/or the server(s) described herein. Furthermore, the merchant device(s) and/or the server(s) described herein may log a split event based on the splitting of item B from the first ticket 302 to the second ticket 304.

Figure 3B:
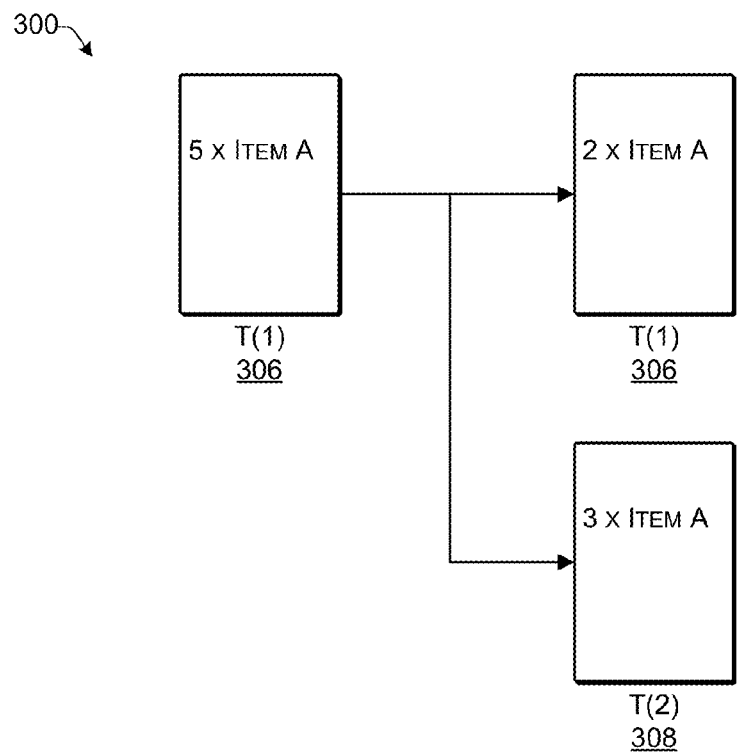
FIG. 3B is a block diagram illustrating an example of splitting an item by quantity from a first ticket to a second ticket.

FIG. 3B is a block diagram illustrating an example of splitting an item by quantity from a first ticket T(1) 306 to a second ticket T(2) 308. The first ticket 306 may include a quantity of a type of item that is more than one. For example, the first ticket 306 may include a quantity of 5 of item A. A quantity of 3 of item A may be split from the first ticket 306 to the second ticket 308, and a quantity of 2 of item A may remain on the first ticket 306.

Figure 3C:
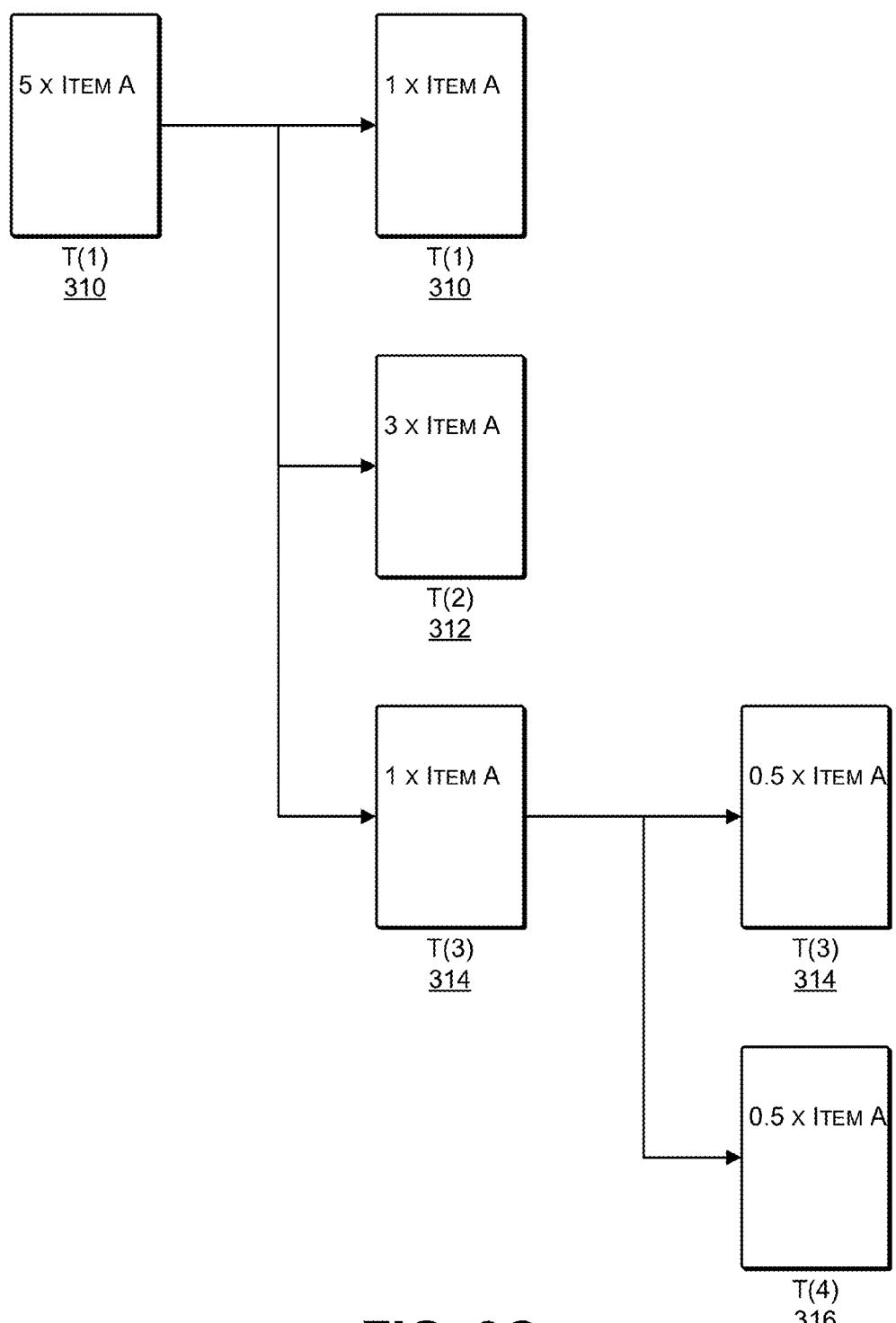
FIG. 3C is a block diagram illustrating an example of splitting an item from a split ticket to another split ticket.

FIG. 3C is a block diagram illustrating an example of splitting an item from a split ticket to another split ticket. A first ticket T(1) 310 may include a quantity of 5 of item A. A quantity of 3 of item A may be split from the first ticket 310 to a second ticket T(2) 312, a quantity of 1 of item A may be split from the first ticket 310 to a third ticket T(3) 314, and a quantity of 1 of item A may remain on the first ticket 310. Next, a fractional quantity of 0.5 of item A may be split from the third ticket 314 (a split ticket) to a fourth ticket T(4) 316 (a split ticket), and a fractional quantity of 0.5 of item A may remain on the third ticket 314.

Figure 4:
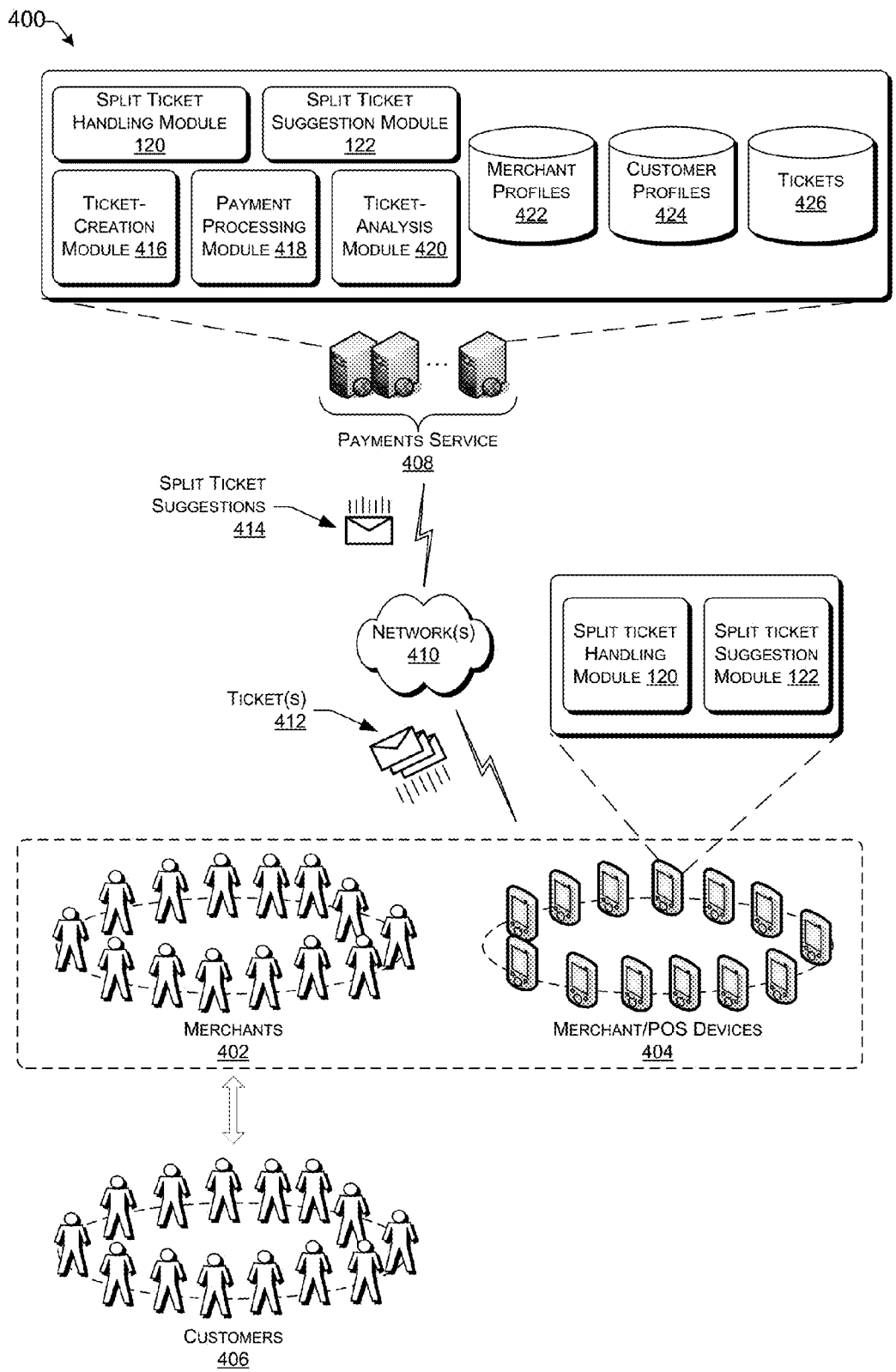
FIG. 4 illustrates an example environment that includes merchants interacting with a community of customers, as well as a payments service that communicates with merchant devices over a network. Within the environment, an example merchant device may provide ticket information to the one or more computing devices associated with the payments service, which may analyze the ticket information and provide a split ticket suggestion back to the merchant device.

FIG. 4 illustrates an example environment 400 that includes different merchants 402 operating respective point-of-sale (POS) devices 404 to engage in various transactions with respective customers 406. The POS devices 404 may comprise any sort of mobile or non-mobile device that includes an instance of a merchant application that executes on the respective device. The merchant application may provide POS functionality to the POS device 404 to enable the merchant 402 (e.g., an owner, employees, etc.) to accept payments from the customers 406. In some types of businesses, one such POS device 404 may correspond to a store or other place of business of the merchant, and thus, may be a fixed location that typically does not change on a day-to-day basis. In other types of businesses, however, the POS device 404 may change from time to time, such as in the case that the merchant operates a food truck, is a street vendor, a cab driver, etc., or has an otherwise mobile business, e.g., in the case of merchants who sell items at buyer's homes, places of business, and so forth.

As used herein, a merchant 402 may include any business engaged in the offering of goods or services for acquisition by customers. Actions attributed to a merchant 402 may include actions performed by owners, employees, or other agents of the merchant 402 and thus no distinction is made herein unless specifically discussed. In addition, as used herein, a customer 406 may include any entity that acquires goods or services from a merchant, such as by purchasing, renting, leasing, borrowing, licensing, or the like. Hereinafter, goods and/or services offered by merchants 402 may be referred to as items. Thus, a merchant 402 and a customer 406 may interact with each other to conduct a transaction in which the customer 406 acquires an item from a merchant 402, and in return, the customer 406 provides payment to the merchant 402.

As used herein, a transaction may include a financial transaction for the acquisition of goods and/or services that is conducted between a customer 406 and a merchant 402. For example, when paying for a transaction, the customer 406 can provide the amount that is due to the merchant 402 using a payment instrument (e.g., a debit card, a credit card, a stored-value or gift card, a check, through an electronic payment application on a device carried by the customer, or the like). The merchant 402 can interact with the POS device 404 to process the transaction, such as by inputting (e.g., manually, via a magnetic card reader or an RFID reader, etc.) an identifier associated with the payment instrument. For example, a payment instrument of one of the customers 406 may include one or more magnetic strips for providing card and customer information when swiped in a card reader. On other instances, the payment instrument of the customer 406 may include a chip that is read by the card reader when the card is dipped into the card reader. In other examples, other types of payment cards may be used, such as smart cards having a built-in memory chip, a radiofrequency identification tag, or so forth.

During the transaction, the POS device 404 can determine transaction information describing the transaction, such as the identifier of the payment instrument, an amount of payment received from the customer 406, the item(s) acquired by the customer, a time, place and date of the transaction, and so forth. The POS device 404 can send the transaction information to a payment service 408 over a network 410, either substantially contemporaneously with the conducting of the transaction (in the case of online transactions) or later when the POS device 404 is in the online mode (in the case offline transactions).

In an offline transaction, the POS device 404 may store one or more characteristics associated with the transaction (i.e., the transaction information), such as a cost of the transaction, a time of day at which the transaction occurred, a day of the week at which the transaction occurred, a location at which the transaction took place, an item that the customer obtained, and a payment instrument used in the transaction. After conducting an offline transaction with one of the customers 406, the POS device 404 may provide the stored information to the payment service 408 over the network 410. The network 410 may represent any one or more wired or wireless networks, such as a WiFi network, a cellular network, or the like.

In some instances, the POS devices 404 of the merchants 402 may maintain open ticket and/or split data structure, which may record interactions made between a customer 406 and a respective merchant 402. For instance, the open ticket data structures described herein may be generated and maintained using some or all of the techniques described in U.S. patent application Ser. No. 14/686,381, filed on Apr. 14, 2015 and entitled "Open Ticket Payment Handling with Offline Mode", which is incorporated herein by reference in its entirety. In some implementations, the split ticket data structure may be the same as, or similar to, the open ticket data structure.

When a customer 406 orders an item, the merchant 402 may enter the item into the POS device 404, which may update the open ticket data structure to note the ordered item and a time at which the item was ordered. In addition, the merchant may insert free-form notes into the open ticket data structure, such as a note documenting a verbal exchange between the customer 406 and the merchant 402 or a sentiment of the customer 406 as perceived by the merchant 402. In still other instances, the POS device 404 of the respective merchant 402 may store multiple tags each denoting a respective typical interaction between merchants 402 and customers 406, such as accepted refill, requested water, requested check, appears happy, appears displeased, or the like. Again, the open ticket data structure may be updated when receiving a free-form note or a tag to indicate a time at which that record was received. In addition, when a customer 406 offers tender (e.g., cash, a gift card, a check, a credit card, etc.) to pay for one or more items acquired from the merchant 402, the merchant 402 may update the open ticket data structure on the POS device 404 of the merchant 402 to indicate this payment. Again, the POS device 404 may indicate a time at which the payment was received.

Proximate to a merchant 402 and a customer 406 ending an engagement (e.g., after settling a cost of the items and/or after the customer receives the last ordered item), the merchant 402 may provide the contents of the open ticket data structure to the payments service 408 for analysis. As illustrated, multiple merchants may send respective tickets 412, including open tickets and/or split tickets, to the payment service 408 for analysis. The payments service 408 may analyze the items ordered, the tenders used, the notes, the tags, and the respective times and sequences of these interactions represented in the open ticket data structure to determine certain preferences or habits of customers generally or of particular customers. With this information, the payments service 408 may then send split ticket suggestions 414 to the POS devices 404 of the merchants 402, as described in further detail below. In some instances, the merchants 402 send the respective tickets 412 to the payments service 408 upon closure of the respective tickets. In other instances, the contents of these tickets may provided as the respective merchant 402 updates the respective ticket. That is, the contents of the ticket as modified on a respective POS device 404 may be synchronized with the contents of the ticket at the payments service 408.

After closure of a ticket (or as part of the payment authorization request), the POS device 404 may provide the contents of the ticket to the payments service 408. The payments service 408 may analyze these contents to determine any preferences or habits of customers generally and/or of a particular customer. By doing so, the payments service 408 may provide real-time split ticket suggestions to the merchant 402

The payments service 408 may include one or more processors and memory, which may store a ticket-creation module 416, a payment processing module 418, a ticket-analysis module 420, a split ticket handling module 120, a split ticket suggestion module 122, merchant profiles 422 corresponding to respective merchants, customer profiles 424 corresponding to respective customers, and tickets 426 including contents of prior open tickets and/or prior split tickets. The ticket-creation module 416 may trigger creation of an open ticket based on any one of multiple triggers. In one particular example, when a customer requests to create a reservation at a particular merchant, the ticket-creation module 416 may send an indication to a device of a merchant indicating the details of the reservation request. In response, the device of the merchant may generate an open ticket for recording subsequent interactions between the customer and the merchant.

The payment processing module 418, meanwhile, may function to receive the information regarding a transaction from the POS device 404 and attempt to authorize the payment instrument used to conduct the transaction. The payment processing module 418 may then send an indication of whether the payment instrument has been approved or declined back to the POS device 404.

Generally, when a customer 406 and a merchant 402 enter into an electronic payment transaction, the transaction is processed by electronically transferring funds from a financial account associated with the customer 406 to a financial account associated with the merchant 402. As such, the payment processing module 418 may communicate with one or more computing devices of a card payment network, e.g., MasterCard®, VISA®, over the network 410 to conduct financial transactions electronically. The payment processing module 418 can also communicate with one or more computing devices of one or more banks over the network 410. For example, the payment processing module 418 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue credit cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

The ticket-analysis module 420, meanwhile, may function to receive tickets, store them in the data store 426, and analyze the tickets to determine preferences and/or habits of customers. For instance, and as described in further detail below, the ticket-analysis module 420 may analyze items ordered, notes and tags within the tickets, and the timing of these events to determine these preferences and habits. In instances where a particular analysis is associated with a particular customer, the ticket-analysis module 420 may store this determined preference or habit in association with the corresponding customer profile in the data store 424.

The split ticket handling module 120 may provide the functionality described herein with respect to split ticket handling. A split ticket handling module 120 may also reside on a POS device 404 to facilitate the coordination of ticket handling between the POS device and the payments service. In some cases, the split ticket handling module 120 may function to handle split tickets in the manner described with reference to FIGS. 1, 2A-2E, 3A-3C, and 5.

The split ticket suggestion module 122 may function to provide split ticket suggestions 414 as described herein. For instance, the split ticket suggestion module 122 may utilize analyses of the ticket-analysis module in determining split ticket suggestions 414. As discussed in further detail below with reference to FIGS. 6-9, the split ticket suggestion module 122 may, in some cases, suggest to split one or more items from a first ticket to a second ticket based at least in part on one or more of merchant information (e.g., merchant profiles 422), customer information (e.g., customer profiles 424), or ticket information (e.g., tickets 426).

Figure 5:
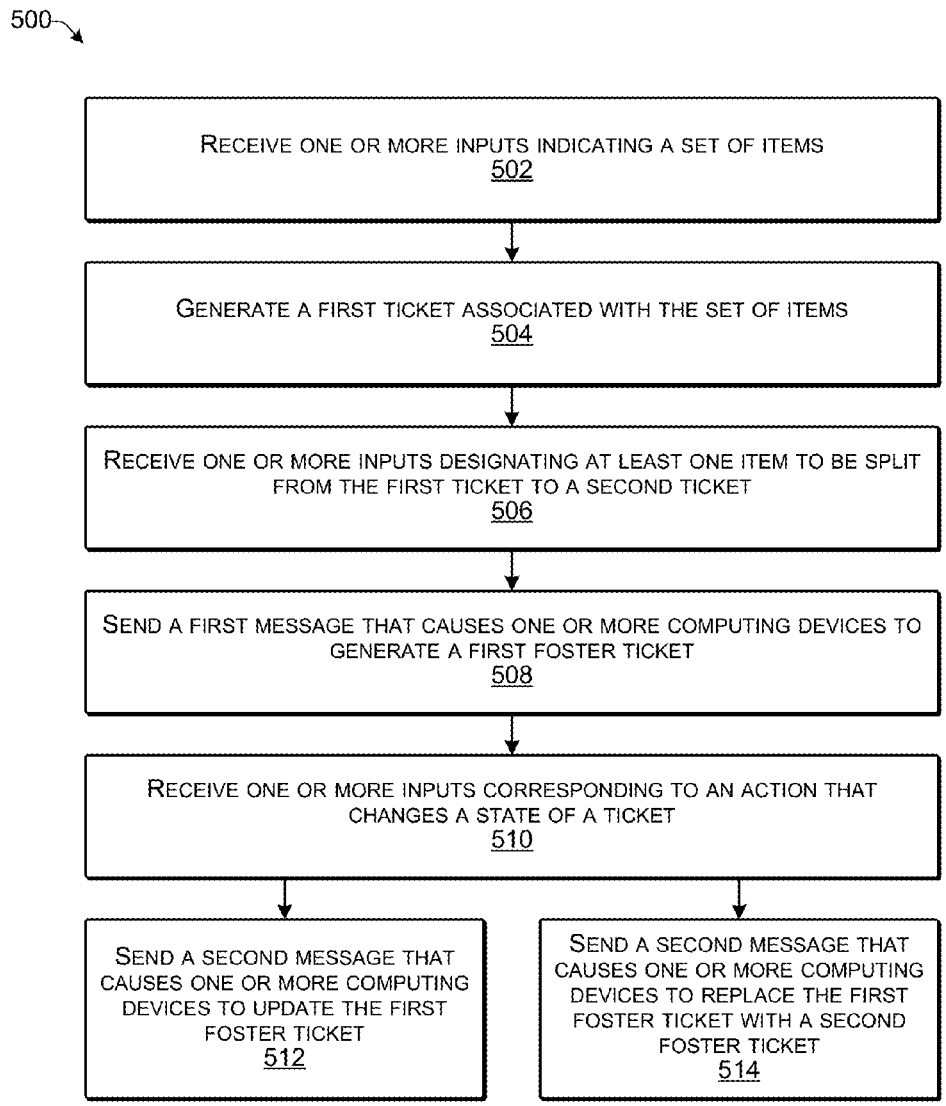
FIG. 5 is a flow diagram illustrating an example process for handling ticket splitting.

FIG. 5 is a flow diagram illustrating an example process 500 for handling ticket splitting, as described in further detail above with reference to FIGS. 1-4. The process 500 and other processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

At 502, the process 500 may receive one or more inputs indicating a set of items. These one or more inputs may be received at least partly via a user interface (UI) of a point-of-sale (POS) device. The set of items may correspond to items that have been ordered by one or more customers from a merchant associated with the POS device. For example, the set of items may correspond to menu items ordered by customers at a restaurant.

At 504, the process 500 may generate a first ticket associated with the set of items. For instance, the first ticket may be an open ticket. The first ticket may be generated at least partly via the POS device. In some cases, the first ticket may be generated while the POS device is operating in an open ticket mode configured to facilitate the generation of open tickets.

At 506, the process 500 may receive one or more inputs designating at least one item to be split from the first ticket to a second ticket. These one or more inputs may be received at least partly via the UI of the POS device. For example, the set of items of the first ticket may correspond to items requested by multiple customers on an open ticket. The customers may request to pay individually for their respective items, or the customers may request that the customer split the items on their open ticket in any other manner that suits them.

In some instances, the merchant associated with the POS device, or the POS device itself, may determine to split one or more items from the first ticket to the second ticket. For example, the POS device may receive a split ticket suggestion from one or more computing devices that are associated with a third party payments service and that are configured to process payments for multiple merchants. The split ticket suggestion may be the one or more inputs that cause the POS device to split one or more items from the first ticket to the second ticket. In some cases, the split ticket suggestion may cause the POS to provide an indication corresponding to the suggestion at least partly via the UI of the POS device, and the merchant may determine to provide, to the POS device, one or more inputs that cause the POS device to split one or more items from the first ticket to the second ticket.

The POS device may provide (e.g., via the UI) an option to initiate a split ticket mode of the POS device. That is, the POS device may be configured to be operable in an open ticket mode and in a split ticket mode. The POS device may be transitioned to the split ticket mode manually and/or automatically.

At 508, the process 500 may send a first message that causes one or more computing devices to generate a first foster ticket. The first message may be sent from the POS device to one or more computing devices associated with the payments service. The first foster ticket may be associated with the first ticket and the set of items. The one or more computing devices associated with the payments service may be configured to use foster tickets to account for items and/or tickets at the POS device. For instance, the first foster ticket may be used to account for items capable of being manipulated at least partly via the UI of the POS device. In some cases, the one or more computing devices associated with the payments service may generate the first foster ticket in response to being notified that the first ticket has been generated. In other cases, the one or more computing devices associated with the payments service may generate the first foster ticket in response to being notified that the split ticket mode has been initiated and/or in response to being notified that one or more items have been split from the first ticket to the second ticket.

At 510, the process 500 may receive one or more inputs corresponding to an action the changes a state of the first ticket or the second ticket. In some cases, these one or more inputs may be received at least partly via the UI of the POS device. For instance, the one or more inputs may correspond to a save of the first ticket and/or the second ticket, a cancel of the first ticket and/or the second ticket, a print of the first ticket and/or the second ticket, a closing out of the first ticket and/or second ticket, or the like.

At 512, the process 500 may send a second message that causes one or more computing devices to update the first foster ticket. Alternatively, the process 500 may, at 514, send a second message that causes one or more computing devices to replace the first foster ticket with a second foster ticket. For instance, the second message may be sent from the POS device to the one or more computing devices associated with the payments service. The second message may be sent to the one or more computing devices in response to receiving one or more inputs corresponding to an action that changes a state of a ticket. For instance, the second message may be sent to the one or more computing devices in response to receiving one or more inputs corresponding to a save of the first ticket or the second ticket.

In some cases, updating the first foster ticket may include replacing the first foster ticket with the second foster ticket. However, in other cases, updating the first foster ticket may include modifying the items with which the first foster ticket is associated and/or modifying the ticket with which the first foster ticket is associated.

When the second foster ticket replaces the first foster ticket, the second foster ticket may be associated with at least one ticket remaining in the UI of the POS device. In some instances, the second foster ticket may be associated with a lowest ordinal ticket remaining in the UI of the POS device. For example, the second foster ticket may be associated with the second ticket in the UI of the POS device in response to a save of the first ticket in the UI (which, in some cases, may also result in the first ticket being dismissed from the UI). The second ticket may be associated with a first identifier, while the second foster ticket may be assigned a second identifier that is correlated to the first identifier. For instance, the first identifier and the second identifier may be the same.

Figure 6:
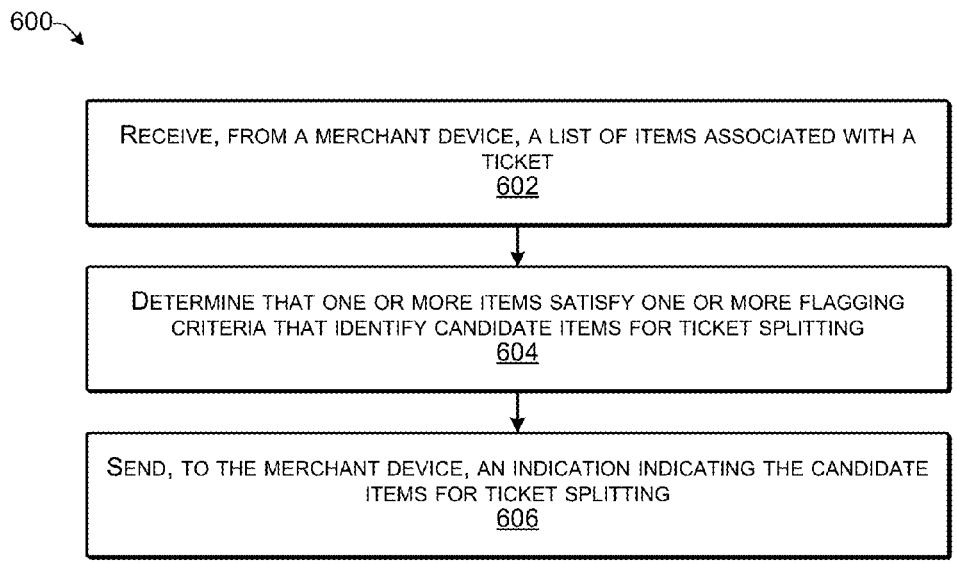
FIG. 6 is a flow diagram illustrating an example process for providing an indication of candidate items for ticket splitting.

FIG. 6 is a flow diagram illustrating an example process 600 for providing an indication of candidate items for ticket splitting. At 602, the process 600 may receive, from a merchant device, a list of items associated with a first ticket. In some cases, the merchant device may be a first merchant device associated with a first merchant. Furthermore, the first ticket may be an open ticket that was generated at least partly via the first merchant device.

The list of items may be received at a one or more computing devices that process payments for multiple merchants including the first merchant. In some cases, the one or more computing devices may receive, from the first merchant device, ticket information including the first ticket and the list of items associated with the first ticket.

At 604, the process 600 may determine that one or more items satisfy one or more flagging criteria that identify candidate items for ticket splitting. This determination may occur, for example, in response to determining that the list of items and/or the first ticket are associated with multiple customers. However, in some cases, the determination may be triggered by a different action or may occur by default.

In some cases, a determination that an item of the list of items satisfies a flagging criterion may include comparing the list of items to historical ticket information. For instance, the list of items may be compared to historical ticket splitting information.

In some examples, a determination that an item of the list of items satisfies a flagging criterion may include comparing the first ticket to a set of split tickets. For instance, a determination that an item of the list of items satisfies a flagging criterion may include calculating a similarity score corresponding to a similarity between a split ticket of the set of split tickets. The determination may also include determining that the similarity score satisfies a similarity threshold. One or more items of the list of items may be identified as candidate items for ticket splitting based at least in part ticket information associated with the split ticket that has a similarity score that satisfies the similarity threshold.

Additionally or alternatively, a determination that an item of the list of items satisfies a flagging criterion may include determining one or more split tickets of the set of split tickets that are nearest neighbors of the first ticket. One or more items of the list of items may be identified as candidate items for ticket splitting based at least in part on determining the one or more nearest neighbor split tickets.

In some instances, the one or more computing devices may receive ticket information from one or more merchant devices including a second merchant device associated with a second merchant that is different than the first merchant. The determination that one or more items of the list of items satisfy one or more flagging criteria may be based at least in part on the ticket information received from the one or more merchant devices.

The one or more flagging criteria may include at least one flagging criterion that identifies candidate items that can be split on a fractional basis. For instance, the flagging criterion may identify an item is of a type that is typically split amongst multiple people, such as an appetizer.

At 606, the process 600 may send, to the merchant device, an indication indicating the candidate items for ticket splitting. In some cases, the one or more computing devices may send an indication that causes the merchant device to provide a suggestion at least partly via a user interface (UI) presented on a display of the merchant device. In some cases, the indication may cause the merchant device to present, at least partly via the UI, a suggestion to split one or more items from the first ticket to a second ticket. Additionally or alternatively, the indication may cause the merchant device to provide a visual indication indicating one or more items identified as candidate items for ticket splitting. In some instances, the indication may cause the merchant device to provide an audible suggestion to split one or more items of the list of items from the first ticket to a second ticket.

Figure 7:
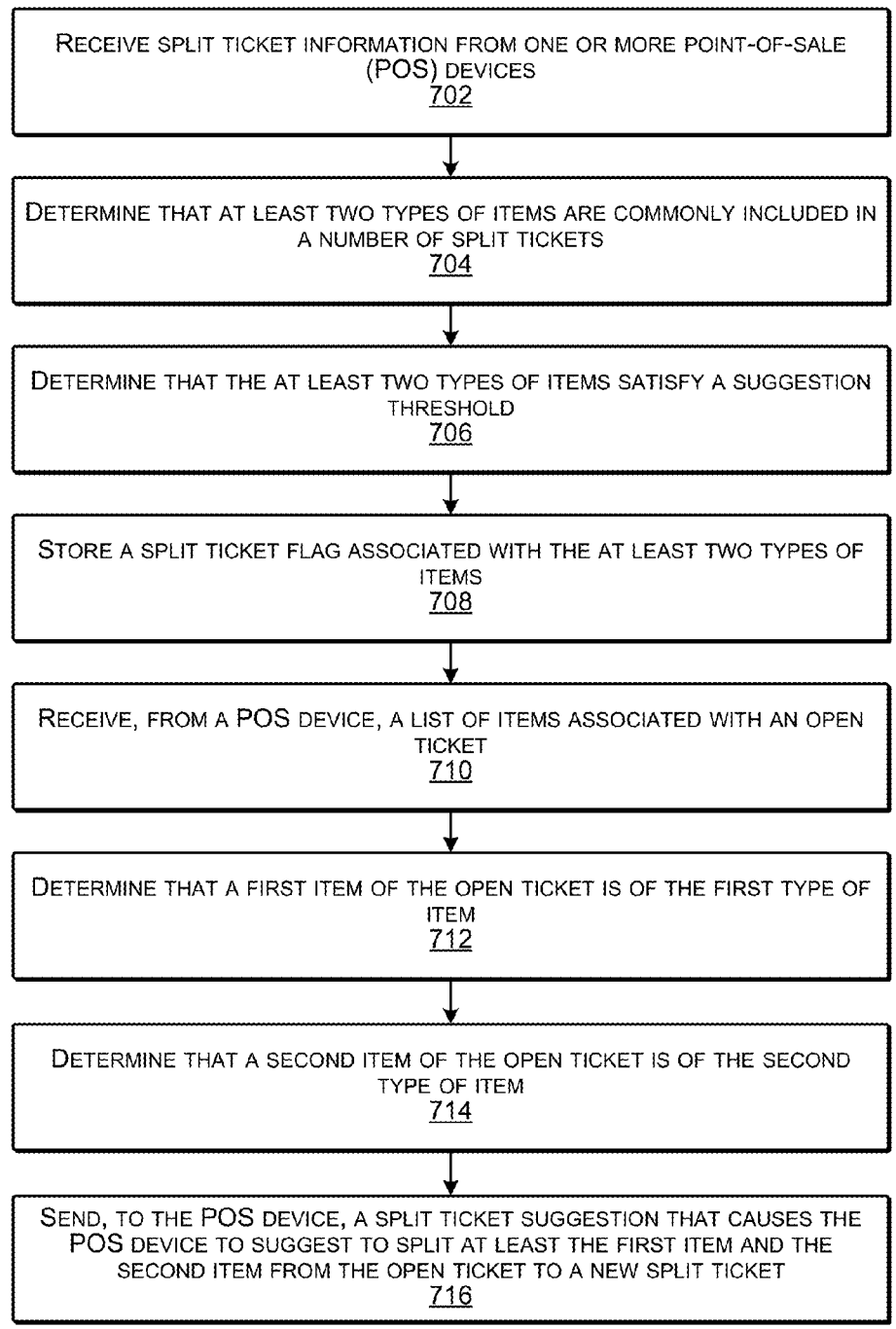
FIG. 7 is a flow diagram illustrating an example process for providing a split ticket suggestion.

FIG. 7 is a flow diagram illustrating an example process 700 for providing a split ticket suggestion. At 702, the process 700 may receive split ticket information from one or more point-of-sale (POS) devices. In some cases, the split ticket information may be received at one or more computing devices associated with a payments service. The split ticket information may be associated with split tickets generated at least partly via one or more POS devices.

At 704, the process 700 may determine that at least two types of items are commonly included in a number of split tickets. In some cases, the one or more computing devices associated with the payments service may determine that a first item and a second item are commonly included in a number of split tickets based at least in part on the split ticket information received from the one or more POS devices.

At 706, the process 700 may determine that the at least two types of items satisfy a suggestion threshold. For instance, the one or more computing devices associated with the payments service may determine that the first type of item and the second type of item satisfy a suggestion threshold based at least in part on the number of split tickets in which the first type of item and the second type of item are commonly included.

At 708, the process 700 may store a split ticket flag associated with the at least two types of items. For example, the split ticket flag may be stored in a database. The database may be accessible to the one or more computing devices associated with the payments service so that the one or more computing devices can use the split ticket flag to provide split ticket suggestions.

At 710, the process 700 may receive, from a POS device, a list of items associated with an open ticket. The open ticket may be generated at least partly via the POS device. The list of items may be received at the one or more computing devices associated with the payments service. Furthermore, the list of items may include a first item and a second item.

At 712, the process 700 may determine that the first item of the open ticket is of the first type of item. For instance, the one or more computing devices associated with the payments service may determine, based at least in part on the split ticket flag, that the first item of the open ticket is of the first type of item associated with the split ticket flag. At 714, the process 700 may determine that the second item of the open ticket is of the second type of item. For instance, the one or more computing devices associated with the payments service may determine, based at least in part on the split ticket flag, that the second item of the open ticket is of the second type of item associated with the split ticket flag.

At 716, the process 700 may send, to the POS device, a split ticket suggestion that causes the POS device to suggest to split at least the first item and the second item from the open ticket to a new split ticket. In some cases, the split ticket suggestion may cause the POS device to provide a suggestion at least partly via a user interface (UI) presented on a display of the POS device. The split ticket suggestion may be sent based at least in part on the split ticket flag stored in the database. In some instances, the split ticket flag may be sent by the one or more computing devices associated with the payments service. For instance, the one or more computing devices may send the split ticket suggestion to the POS device in response to receiving a request for a split ticket suggestion. However, in some instances, the one or more computing devices may send the split ticket suggestion to the POS device without receiving a request for a split ticket suggestion.

In some cases, the one or more computing devices associated with the payments service may receive split ticket suggestion feedback from the POS device. For example, the one or more computing devices may receive, from the POS device, an indication indicating whether the split ticket suggestion actually resulted in the first item and the second item being split from the open ticket to a new split ticket. In such cases, the one or more computing devices may again determine, based at least in part on the indication, whether the first type of item and the second type of item continue to satisfy the suggestion threshold. That is, the one or more computing devices may utilize split ticket suggestion feedback received from one or more POS devices to update split ticket flags stored in the database.

Figure 8:
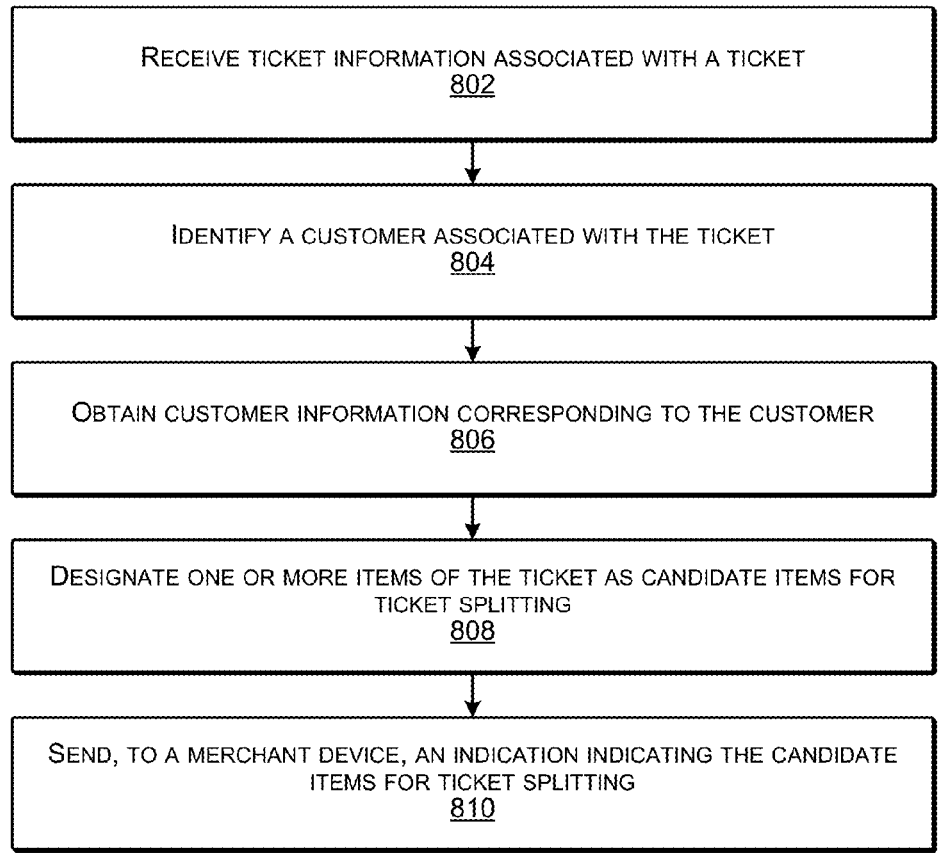
FIG. 8 is a flow diagram illustrating another example process for providing an indication of candidate items for ticket splitting.

FIG. 8 is a flow diagram illustrating another example process 800 for providing an indication of candidate items for ticket splitting. At 802, the process 800 may receive ticket information associated with a ticket. For instance, one or more computing devices associated with a payments service may receive the ticket information from a merchant device. The ticket information may include a list of items of the ticket and an indication of one or more customers associated with the ticket.

At 804, the process 800 may identify a customer associated with the ticket. For example, the one or more computing devices associated with the payments service may identify the customer based at least in part on the ticket information. In some cases, the one or more computing devices may access customer profiles and determine that an identification associated with the customer in the customer profiles is correlated with an identification associated with the customer in the ticket information.

At 806, the process 800 may obtain customer information corresponding to the customer. The customer information may include historical ticket information associated with the customer. In some instances, the one or more computing devices associated with the payments service may obtain customer information corresponding to the customer from data stores that include customer profiles, ticket information, and/or other information associated with customers.

At 808, the process 800 may designate one or more items of the ticket as candidate items for ticket splitting. For instance, the one or more computing devices associated with the payments service may designate one or more items of the ticket as candidate items for ticket splitting based at least in part on the customer information associated with the customer. In some cases, the one or more computing devices may additionally or alternatively designate one or more items of the ticket as candidate items for ticket splitting based at least in part on split ticket information received from one or more merchant devices.

At 810, the process 800 may send, to a merchant device, an indication indicating the candidate items for ticket splitting. In some cases, the one or more computing devices associated with the payments service may send the indication to the merchant device. The indication may cause the merchant device to present a prompt corresponding to a suggestion to split an item from the ticket to another ticket.

Figure 9:
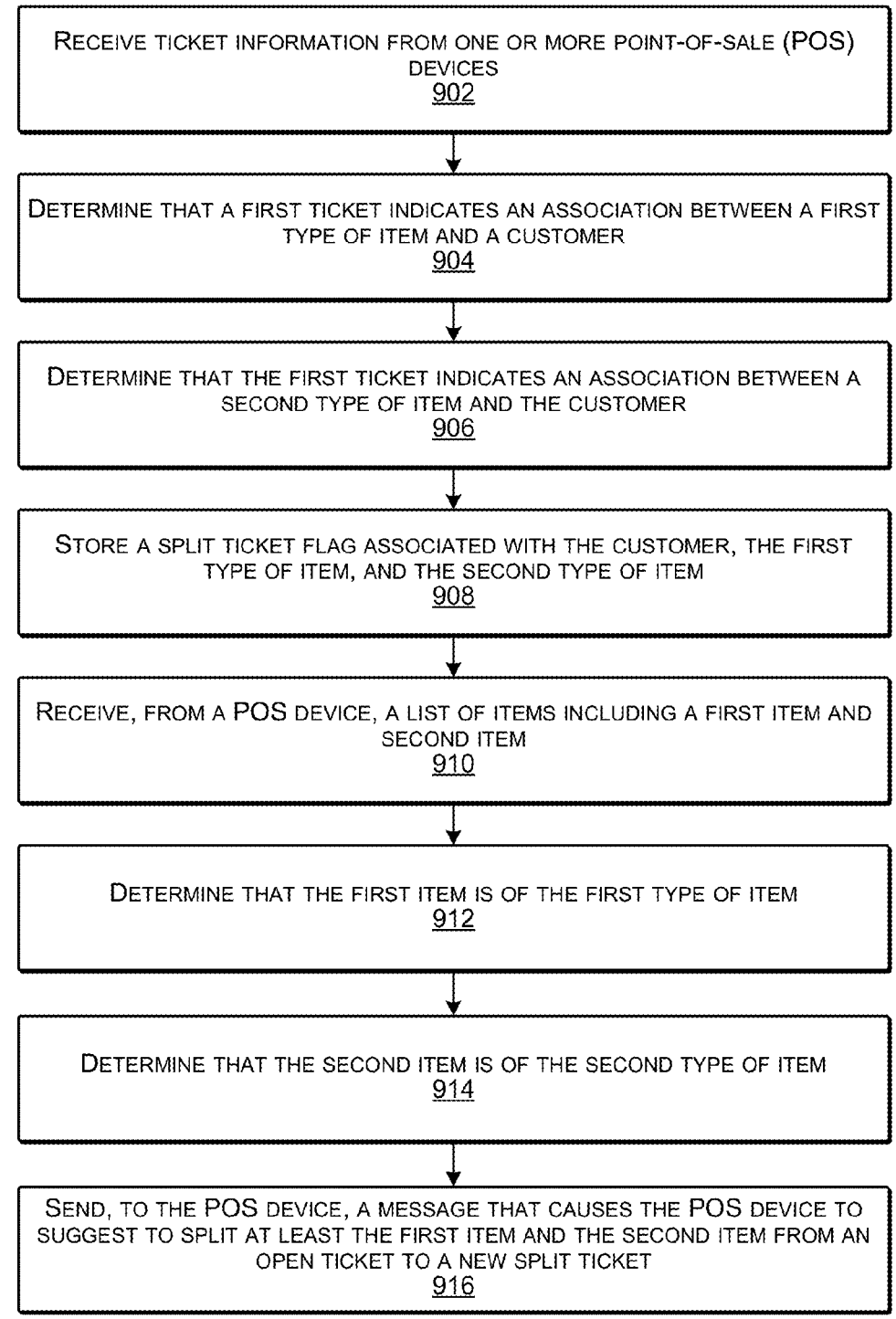
FIG. 9 is a flow diagram illustrating another example process for providing a split ticket suggestion.

FIG. 9 is a flow diagram illustrating another example process 900 for providing a split ticket suggestion. At 902, the process 900 may receive ticket information from one or more point-of-sale (POS) devices. The ticket information may be associated with tickets generated at least partly via the one or more POS devices. One or more of the tickets may indicate associations between items and customers. In some cases, one or more computing devices associated with a payments service may receive the ticket information from the one or more POS devices. In some instances, the one or more POS devices may include a first POS device associated with a first merchant, and a second POS device associated with a second merchant. The second merchant may be different than the first merchant.

At 904, the process 900 may determine that a first ticket received from the one or more POS devices indicates an association between a first type of item and a customer. For instance, the one or more computing devices associated with the payments service may determine that the first ticket indicates an association between the first type of item and the customer based at least in part on the ticket information. Furthermore, the process 900 may, at 906 determine that the first ticket indicates an association between a second type of item and the customer. For instance, the one or more computing devices may determine that the first ticket indicates an association between the second type of item and the customer based at least in part on the ticket information. At 908, the process 900 may store a split ticket flag associated with the customer, the first type of item, and the second type of item.

At 910, the process 900 may receive, from a POS device, a list of items including a first item and a second item. For example, the one or more computing devices associated with the payments service may receive the list of items from the second POS device. The list of items may indicate an association between the first item and the customer. Furthermore, the list of items may indicate an association between the second item and the customer.

At 912, the process 900 may determine that the first item is of the first type of item. For instance, the one or more computing devices associated with the payments service may determine that the first item is of the first type of item based at least in part on the split ticket flag associated with the customer. Furthermore, the process 900 may, at 914, determine that the second item is of the second type of item. For instance, the one or more computing devices may determine that the second item is of the second type of item based at least in part on the split ticket flag associated with the customer.

At 916, the process 900 may send, to the POS device, the message that causes the POS device to suggest to split at least the first item and the second item from an open ticket to a new split ticket. For example, the one or more computing devices may send the message to the second POS device based at least in part on the split ticket flag stored associated with the customer.

Figure 10:
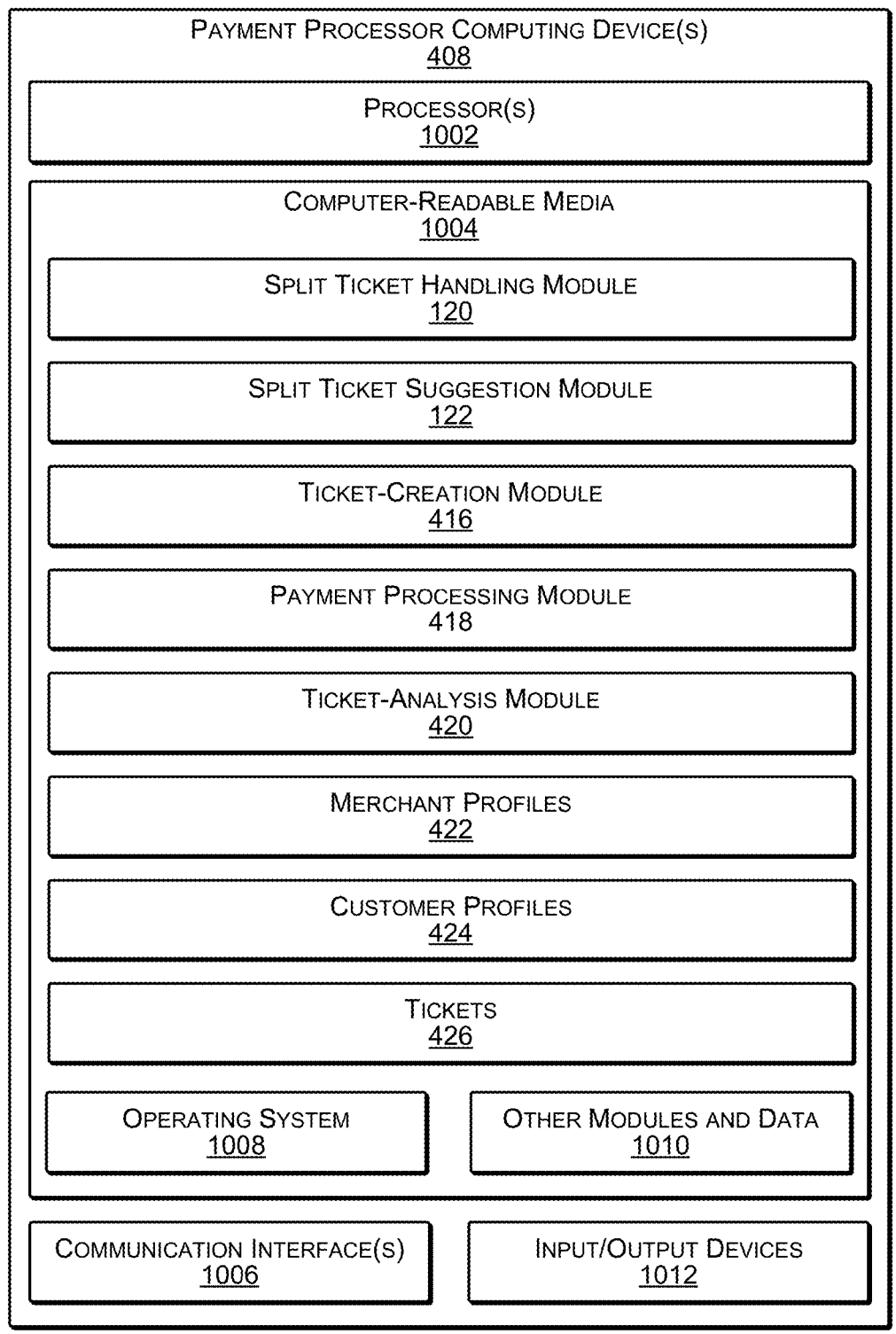
FIG. 10 illustrates select components of a payment processor computing device according to some implementations.

FIG. 10 illustrates select example components of the payment processor computing device 408 according to some implementations. The payment processor computing device 408 may be operated by a service provider that provides the payment service, and may include one or more servers or other types of computing devices that may be embodied in any number of ways. For instance, in the case of a server, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while the figures illustrate the components and data of the payment processor computing device 408 as being present in a single location, these components and data may alternatively be distributed across different computing devices and different locations in any manner. Consequently, the functions may be implemented by one or more payment processor computing devices 408, with the various functionality described above distributed in various ways across the different computing devices. Multiple payment processor computing devices 408 may be located together or separately, and organized, for example, as virtual servers, server banks and/or server farms. The described functionality may be provided by the servers of a single entity or enterprise, or may be provided by the servers and/or services of multiple different buyers or enterprises.

In the illustrated example, each payment processor computing device 408 may include one or more processors 1002, one or more computer-readable media 1004, and one or more communication interfaces 1006. Each processor 1002 may be a single processing unit or a number of processing units, and may include single or multiple computing units or multiple processing cores. The processor(s) 1002 can be implemented as one or more microprocessors, microcomputers, microcontrollers, digital signal processors, central processing units, state machines, logic circuitries, and/or any devices that manipulate signals based on operational instructions. For instance, the processor(s) 1002 may be one or more hardware processors and/or logic circuits of any suitable type specifically programmed or configured to execute the algorithms and processes described herein. The processor(s) 1002 can be configured to fetch and execute computer-readable instructions stored in the computer-readable media 1004, which can program the processor(s) 1002 to perform the functions described herein.

The computer-readable media 1004 may include volatile and nonvolatile memory and/or removable and non-removable media implemented in any type of technology for storage of information, such as computer-readable instructions, data structures, program modules, or other data. Such computer-readable media 1004 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the payment processor computing device 408, the computer-readable media 1004 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 1004 may be used to store any number of functional components that are executable by the processors 1002. In many implementations, these functional components comprise instructions or programs that are executable by the processors 1002 and that, when executed, specifically configure the one or more processors 1002 to perform the actions attributed above to the payment service computing device 408. Functional components stored in the computer-readable media 1004 may include the split ticket handling module 120, the split ticket suggestion module 122, the ticket-creation module 416, the payment processing module 418, and the ticket analysis module 420. Additional functional components stored in the computer-readable media 1004 may include an operating system 1008 for controlling and managing various functions of the payment processor computing device 408.

In addition, the computer-readable media 1004 may store data used for performing the operations described herein. Thus, the computer-readable media 1004 may store merchant information including merchant profiles 422, customer information including customer profiles 424, and ticket information including tickets 426. The payment processor computing device 408 may also include or maintain other functional components and data, such as other modules and data 1010, which may include programs, drivers, etc., and the data used or generated by the functional components. Further, the payment processor computing device 408 may include many other logical, programmatic and physical components, of which those described above are merely examples that are related to the discussion herein.

The communication interface(s) 1006 may include one or more interfaces and hardware components for enabling communication with various other devices, such as over the network(s) 410. For example, communication interface(s) 1006 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The payment processor computing device 408 may further be equipped with various input/output (I/O) devices 1012. Such I/O devices 1012 may include a display, various user interface controls (e.g., buttons, joystick, keyboard, mouse, touch screen, etc.), audio speakers, connection ports and so forth.

Figure 11:
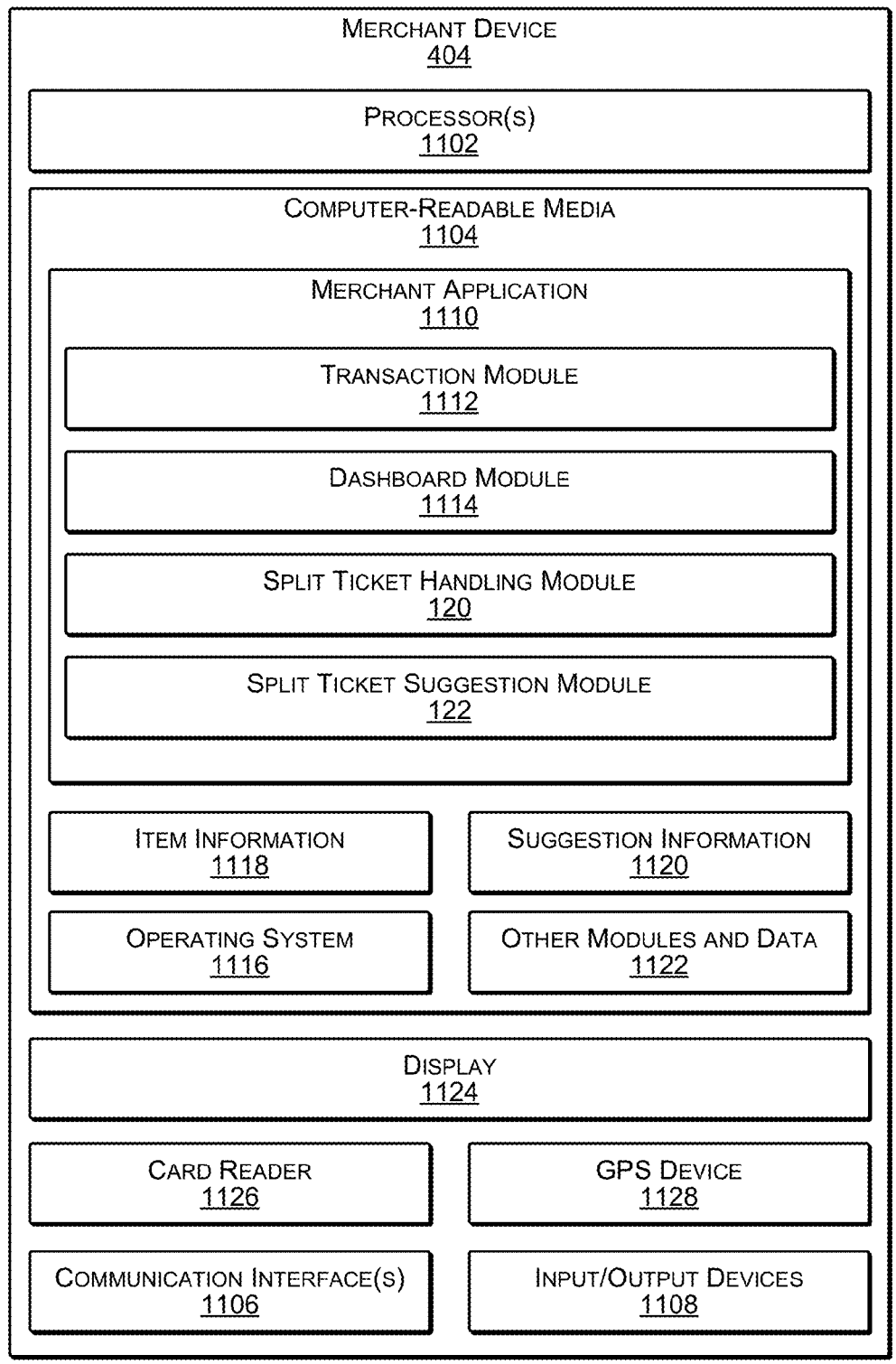
FIG. 11 illustrates select components of a merchant device according to some implementations.

FIG. 11 illustrates select example components of an example merchant device 404 according to some implementations. The merchant device 404 may be any suitable type of computing device, e.g., portable, semi-portable, semi-stationary, or stationary. Some examples of the merchant device 404 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the merchant device 404 includes at least one processor 1102, one or more computer-readable media 1104, one or more communication interfaces 1106, and one or more input/output (I/O) devices 1108. Each processor 1102 may itself comprise one or more processors or processing cores. For example, the processor 1102 can be implemented as one or more microprocessors, microcomputers, microcontrollers, digital signal processors, central processing units, state machines, logic circuitries, and/or any devices that manipulate signals based on operational instructions. In some cases, the processor 1102 may be one or more hardware processors and/or logic circuits of any suitable type specifically programmed or configured to execute the algorithms and processes described herein. The processor 1102 can be configured to fetch and execute computer-readable processor-executable instructions stored in the computer-readable media 1104.

Depending on the configuration of the merchant device 404, the computer-readable media 1104 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 1104 may include, but is not limited to, RAM, ROM, EEPROM, flash memory, solid-state storage, magnetic disk storage, optical storage, and/or other computer-readable media technology. Further, in some cases, the merchant device 404 may access external storage, such as RAID storage systems, storage arrays, network attached storage, storage area networks, cloud storage, or any other medium that can be used to store information and that can be accessed by the processor 1102 directly or through another computing device or network. Accordingly, the computer-readable media 1104 may be computer storage media able to store instructions, modules or components that may be executed by the processor 1102. Further, when mentioned, non-transitory computer-readable media exclude media such as energy, carrier signals, electromagnetic waves, and signals per se.

The computer-readable media 1104 may be used to store and maintain any number of functional components that are executable by the processor 1102. In some implementations, these functional components comprise instructions or programs that are executable by the processor 1102 and that, when executed, implement operational logic for performing the actions and services attributed above to the merchant device 404. Functional components of the merchant device 404 stored in the computer-readable media 1104 may include a merchant application 1110. In this example, the merchant application 1110 includes a transaction module 1112 and a dashboard module 1114. For example, the transaction module 1112 may present an interface, such as a payment interface to enable the merchant to conduct transactions, receive payments, and so forth, as well as for communicating with the payment processor computing devices 408 for processing payments and sending transaction information. Further, the dashboard module 1114 may present a setup interface to enable the merchant to setup items, such as for adding new items or modifying information for existing items. The dashboard module 1114 may further enable the merchant to manage the merchant's account, the merchant profile, merchant preferences, view saved or new information, and the like. The computer-readable media and/or the merchant application 1110 may also include the split ticket handling module 120 and/or the split ticket suggestion module 122. Additional functional components may include an operating system 1116 for controlling and managing various functions of the merchant device 404 and for enabling basic user interactions with the merchant device 404.

In addition, the computer-readable media 1104 may also store data, data structures and the like, that are used by the functional components. For example, data stored by the computer-readable media 1104 may include item information 1118 that includes information about items offered by the merchant, which may include a list of items currently available from the merchant, images of the items, descriptions of the items, prices of the items, and so forth. Furthermore, the computer-readable media 1104 may have stored thereon suggestion information 1120 that has been received from the payment service provider and stored at least temporarily, or the like. Depending on the type of the merchant device 404, the computer-readable media 1104 may also optionally include other functional components and data, such as other modules and data 1122, which may include programs, drivers, etc., and the data used or generated by the functional components. Further, the merchant device 404 may include many other logical, programmatic and physical components, of which those described are merely examples that are related to the discussion herein.

The communication interface(s) 1106 may include one or more interfaces and hardware components for enabling communication with various other devices, such as over the network(s) 410 or directly. For example, communication interface(s) 1106 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 11 further illustrates that the merchant device 404 may include a display 1124 mentioned above. Depending on the type of computing device used as the merchant device 404, the display 1124 may employ any suitable display technology. For example, the display 1124 may be a liquid crystal display, a plasma display, a light-emitting diode display, an OLED (organic light-emitting diode) display, an electronic paper display, or any other suitable type of display able to present digital content thereon. In some examples, the display 1124 may have a touch sensor associated with the display 1124 to provide a touchscreen display configured to receive touch inputs for enabling interaction with a graphic interface presented on the display 1124. Accordingly, implementations herein are not limited to any particular display technology. Alternatively, in some examples, the merchant device 404 may not include the display 1124, and information may be presented by other means, such as aurally.

The merchant device 404 may further include the one or more I/O devices 1108. The I/O devices 1108 may include speakers, a microphone, a camera, and various user controls (e.g., buttons, a joystick, a keyboard, a keypad, etc.), a haptic output device, and so forth.

In addition, the merchant device 404 may include or may be connectable to a card reader 1126. In some examples, the card reader 1126 may plug in to a port in the merchant device 404, such as a microphone/headphone port, a data port, or other suitable port. The card reader 1126 may include a read head for reading a magnetic strip of a payment card, and further may include encryption technology for encrypting the information read from the magnetic strip. Alternatively, numerous other types of card readers 1126 may be employed with the merchant devices 404 herein, depending on the type and configuration of the merchant device 404.

Other components included in the merchant device 404 may include various types of sensors, which may include a GPS device 1128 able to indicate location information, as well as other sensors (not shown) such as an accelerometer, gyroscope, compass, proximity sensor, and the like. Additionally, the merchant device 404 may include various other components that are not shown, examples of which include removable storage, a power source, such as a battery and power control unit, and so forth.

Figure 12:
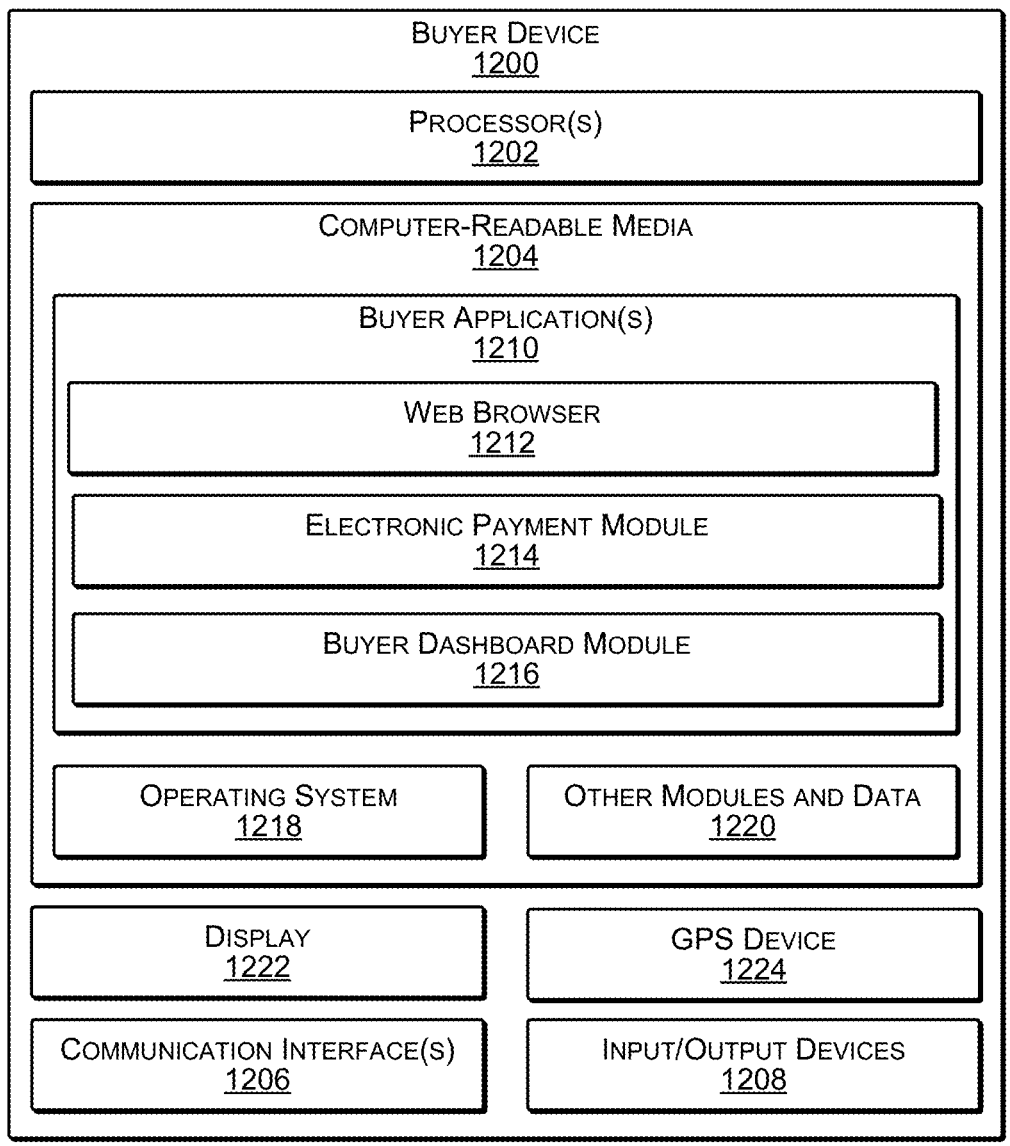
FIG. 12 illustrates select components of a buyer device according to some implementations.

FIG. 12 illustrates select example components of a buyer device 1200 that may implement the functionality described above according to some examples. The buyer device 1200 may be any of a number of different types of computing devices, including portable computing devices. Some examples of the buyer device 1200 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein.

In the example of FIG. 12, the buyer device 1200 includes components such as at least one processor 1202, one or more computer-readable media 1204, the one or more communication interfaces 1206, and one or more input/output (I/O) devices 1208. Each processor 1202 may itself comprise one or more processors or processing cores. For example, the processor 1202 can be implemented as one or more microprocessors, microcomputers, microcontrollers, digital signal processors, central processing units, state machines, logic circuitries, and/or any devices that manipulate signals based on operational instructions. In some cases, the processor 1202 may be one or more hardware processors and/or logic circuits of any suitable type specifically programmed or configured to execute the algorithms and processes described herein. The processor 1202 can be configured to fetch and execute computer-readable processor-executable instructions stored in the computer-readable media 1204.

Depending on the configuration of the buyer device 1200, the computer-readable media 1204 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 1204 may include, but is not limited to, RAM, ROM, EEPROM, flash memory, solid-state storage, magnetic disk storage, optical storage, and/or other computer-readable media technology. Further, in some cases, the buyer device 1200 may access external storage, such as RAID storage systems, storage arrays, network attached storage, storage area networks, cloud storage, or any other medium that can be used to store information and that can be accessed by the processor 1202 directly or through another computing device or network. Accordingly, the computer-readable media 1204 may be computer storage media able to store instructions, modules or components that may be executed by the processor 1202. Further, when mentioned, non-transitory computer-readable media exclude media such as energy, carrier signals, electromagnetic waves, and signals per se.

The computer-readable media 1204 may be used to store and maintain any number of functional components that are executable by the processor 1202. In some implementations, these functional components comprise instructions or programs that are executable by the processor 1202 and that, when executed, implement operational logic for performing actions and services. Functional components of the buyer device 1200 stored in the computer-readable media 1204 may include buyer application(s) 1210. For example, the buyer applications 1210 may include a web browser 1212, an electronic payment module 1214 that provides functionality allowing the buyer to make electronic payments, and a buyer dashboard module 1216. For example, the buyer dashboard module 1216 may present the buyer with an interface for managing the buyer's account, changing information, changing preferences, viewing and/or managing ticket information, and so forth. Additional functional components may include an operating system 1218 for controlling and managing various functions of the buyer device 1200 and for enabling basic user interactions with the buyer device 1200.

In addition, the computer-readable media 1204 may also store data, data structures and the like, that are used by the functional components. Depending on the type of the buyer device 1200, the computer-readable media 1204 may also optionally include other functional components and data, such as other modules and data 1220, which may include applications, programs, drivers, etc., and the data used or generated by the functional components. Further, the buyer device 1200 may include many other logical, programmatic and physical components, of which those described are merely examples that are related to the discussion herein.

The communication interface(s) 1206 may include one or more interfaces and hardware components for enabling communication with various other devices, such as over the network(s) 410 or directly. For example, communication interface(s) 1206 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 12 further illustrates that the buyer device 1200 may include a display 1222. Depending on the type of computing device used as the buyer device 1200, the display 1222 may employ any suitable display technology. For example, the display 1222 may be a liquid crystal display, a plasma display, a light-emitting diode display, an OLED (organic light-emitting diode) display, an electronic paper display, or any other suitable type of display able to present digital content thereon. In some examples, the display 1222 may have a touch sensor associated with the display 1222 to provide a touchscreen display configured to receive touch inputs for enabling interaction with a graphic interface presented on the display 1222. Accordingly, implementations herein are not limited to any particular display technology. Alternatively, in some examples, the buyer device 1200 may not include a display.

The buyer device 1200 may further include the one or more I/O devices 1208. The I/O devices 1208 may include speakers, a microphone, a camera, and various user controls (e.g., buttons, a joystick, a keyboard, a keypad, etc.), a haptic output device, and so forth.

Other components included in the buyer device 1200 may include various types of sensors, which may include a GPS device 1224 able to indicate location information, as well as other sensors (not shown) such as an accelerometer, gyroscope, compass, proximity sensor, and the like. Additionally, the buyer device 1200 may include various other components that are not shown, examples of which include removable storage, a power source, such as a battery and power control unit, and so forth.

Various instructions, methods and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A point-of-sale (POS) system for tracking states of one or more open tickets associated with one or more transactions, the POS system including:
   a POS device for receiving payment for a cost of a transaction, the POS device comprising:
      a display;
      first memory;
      one or more first processors; and
      one or more first computer-readable media storing first computer-executable instructions that, when executed on the one or more first processors, cause the one or more first processors to perform first acts comprising:
         receiving, at least partly via an open ticket mode of a user interface (UI) presented on the display, a first input designating a set of items to a first ticket, the set of items including a first item and a second item, and the first ticket being associated with a first state;
         storing, in the first memory of the POS device, the first ticket in association with the set of items and in association with a first identifier;
         sending, to one or more serving devices associated with a payment processor that processes payments for multiple merchants including a merchant associated with the POS device, a first message that causes the one or more serving devices to store a duplicate of the first ticket,
         the duplicate of the first ticket being associated with a second state that is different than the first state,
         the duplicate of the first ticket being a first foster ticket that is associated with the set of items and that is associated with the first identifier, the one or more serving devices being configured to use at least the first foster ticket to account for items capable of being manipulated in a ticket splitting mode of the UI of the POS device;

receiving, at least partly via the UI, a second input that initiates a split ticket mode of the UI for splitting tickets;

receiving, at least partly via the split ticket mode of the UI, a third input designating at least the first item to be split from the first ticket to a second ticket;

storing, in the first memory of the POS device, the second ticket in association with at least the first item;

receiving, at least partly via the split ticket mode of the UI, a fourth input corresponding to a save of the first ticket;

at least partly responsive to receiving the fourth input:
  dismissing the first ticket from the split ticket mode of the UI;
  determining a first subset of items associated with tickets that remain in the split ticket mode of the UI after the dismissing the first ticket;
  determining a second identifier associated with the second ticket; and
  sending, to the one or more serving devices, a second message that causes the one or more serving devices to generate a second foster ticket and to store the second foster ticket in association with the first subset of items and the second identifier, the second foster ticket replacing the first foster ticket and the second foster ticket being associated with the second ticket via the second identifier;

receiving, at least partly via the split ticket mode of the UI, a fifth input corresponding to a save of the second ticket;

at least partly responsive to receiving the fifth input:
  dismissing the second ticket from the split ticket mode of the UI;
  determining a second subset of items associated with at least one remaining ticket that remains in the split ticket mode of the UI after the dismissing the second ticket; and
  sending, to the one or more serving devices, a third message that causes the one or more serving devices to update the association between the second foster ticket and the first subset of items to an association between the second foster ticket and the second subset of items; and receiving, at least partly via the split ticket mode of the UI, a sixth input to recall the first ticket; and the one or more serving devices comprising:
  second memory;
  one or more second processors; and
  one or more second computer-readable media storing second computer-executable instructions that, when executed on the one or more second processors, cause the one or more second processors to perform second acts comprising:
    accessing the first ticket; and
    sending the first ticket to the POS device to enable the POS device to access the first ticket after the first ticket has been dismissed from the split ticket mode of the UI.

2. The POS system of claim 1, the first acts further comprising:
  receiving, at least partly via the split ticket mode of the UI, a seventh input designating at least the second item to be split from the first ticket to a third ticket;
  receiving an eighth input corresponding to a cancel of the third ticket;
  at least partly responsive to the receiving the eighth input:
    dismissing the third ticket from the UI; and
    updating, in the UI, the first ticket to include the at least the second item.

3. The POS system of claim 2, wherein the updating the first ticket to include the at least the second item is based at least in part on one or more of:
  the first foster ticket;
  a parent-child relationship between the first ticket and the third ticket; or
  a split ticket event that has been logged in association with the first ticket and the third ticket.

4. A method implemented at least in part by an application executing on a point-of-sale (POS) device, the method comprising:
  receiving, at least partly via a user interface (UI) presented by the application, a first input indicating a set of items that have been ordered by one or more customers from a merchant associated with the POS device;
  generating, by the application, a first ticket associated with the set of items;
  sending, from the application and to one or more serving devices, a first message that causes the one or more serving devices to generate a first foster ticket having an association with the first ticket and the set of items, the first foster ticket being a duplicate of the first ticket, the first foster ticket being associated with a different state than the first ticket, and
    the one or more serving devices being configured to use foster tickets to account for items capable of being manipulated at least partly via the UI of the POS device;
  receiving, via the UI, a second input corresponding to an action that changes a state of the first ticket to a changed state in the UI;
  sending, from the application and at least partly responsive to the receiving the second input, a second message that causes the one or more serving devices to affect a change to the first foster ticket;
  receiving, at the one or more serving devices, the second message;
  affecting, by the one or more serving devices, the change to the first foster ticket;
  receiving, via the UI, a third input requesting to change the changed state of the first ticket to a new state;
  sending, from the application and to the one or more serving devices, a third message that causes the one or more serving devices to access the first foster ticket for provisioning information associated with the first foster ticket based on the third input;
  receiving, at the one or more serving devices, the third message;
  accessing, by the one or more serving devices and based on receiving the third message, the first foster ticket;
  provisioning, from the one or more serving devices and to the application, information from the first foster ticket to enable the application to change the changed state of the first ticket to the new state; and modifying, by the application, the changed state of the first ticket to the new state based at least in part on receiving the information from the first foster ticket.

5. The method of claim 4, wherein:
the one or more serving devices are associated with a third-party payment processor; and
the one or more serving devices are configured to process payments for multiple merchants including the merchant associated with the POS device.

6. The method of claim 4, further comprising:
receiving, via the UI, a fourth input designating at least one item of the set of items to be split from the first ticket to a second ticket, wherein the first ticket is an open ticket generated while the UI is operable in an open ticket mode and the second ticket is a split ticket generated while the UI is operable in a split ticket mode; and
receiving, at least partly via the UI, a fifth input that causes the POS device to transition from the open ticket mode to the split ticket mode.

7. The method of claim 4, wherein the second input corresponds to one or more of:
a save of the first ticket;
a cancel of the first ticket;
a print of the first ticket; or
a close out of the first ticket.

8. The method of claim 4, further comprising:
receiving, via the UI, a fourth input designating at least one item of the set of items to be split from the first ticket to a second ticket;
presenting, via the UI, the first ticket and the second ticket, wherein the UI is presented on a display of the POS device;
receiving, via the UI, a fifth input corresponding to at least one of a save or a cancel of at least one of the first ticket or the second ticket; and
dismissing, by the application and at least partly responsive to the receiving the fifth input, at least one of the first ticket or the second ticket, wherein the dismissing includes removing the at least one of the first ticket or the second ticket from the UI presented on the display.

9. The method of claim 4, further comprising receiving, via the UI, a fourth input designating at least one item of the set of items to be split from the first ticket to a second ticket, wherein:
the second input corresponds to a save of the first ticket; and
the second message causes the one or more serving devices to generate a second foster ticket that replaces the first foster ticket, the second foster ticket being associated with items remaining in the UI.

10. The method of claim 9, further comprising dismissing, by the application and at least partly responsive to the receiving the second input, the first ticket from the UI.

11. The method of claim 9, further comprising associating, by the one or more serving devices, the second foster ticket with at least one ticket remaining in the UI.

12. The method of claim 11, wherein the associating the second foster ticket with at least one ticket remaining in the UI of the POS device includes associating the second foster ticket with a lowest ordinal ticket remaining in the UI.

13. The method of claim 11, wherein the second foster ticket is associated with the second ticket based at least in part on the second ticket being a lowest ordinal ticket remaining in the UI, the second ticket is associated with a first identifier, and the method further comprises assigning, by the one or more serving devices, the second foster ticket a second identifier that is correlated to the first identifier.

14. The method of claim 4, further comprising receiving, via the UI, a fourth input designating at least one item of the set of items to be split from the first ticket to a second ticket, wherein:
the second input corresponds to a save of the second ticket; and
the second message causes the one or more serving devices to update the association between the first foster ticket and the set of items to an association between the first foster ticket and items remaining in the UI.

15. The method of claim 4, further comprising generating, by the one or more serving devices, a log that indicates at least one of parent-child relationships established between tickets or split event information associated with ticket splitting.

16. One or more non-transitory computer-readable media storing computer-executable instructions that, when executed, cause one or more processors to perform acts comprising:
designating a set of items to a first ticket of a point-of-sale (POS) device associated with a merchant, the set of items including a first item and a second item;
sending, to one or more serving devices of a payment processor configured to process payments for multiple merchants including the merchant associated with the POS device, a first message that causes the one or more serving devices to generate a first foster ticket associated with the first ticket and the set of items,
the first foster ticket being a duplicate of the first ticket, the first foster ticket being associated with a different state than the first ticket, and
the one or more serving devices being configured to use foster tickets to account for items capable of being manipulated in a user interface (UI) of the POS device;
determining to change a state of the first ticket to a changed state;
sending, at least partly responsive to changing the state of the first ticket, a second message that causes the one or more serving devices to update the first foster ticket;
receiving an indication to change the state of the first ticket to a new state;
sending a third message that causes the one or more serving devices to access the first foster ticket;
receiving, from the one or more serving devices, information to facilitate the change of the state of the first ticket to the new state, the information being based on the first foster ticket; and
changing the state of the first ticket to the new state based at least in part on the information.

17. The one or more non-transitory computer-readable media of claim 16, wherein the acts further comprise:
splitting at least the first item from the first ticket to a second ticket;
establishing a parent-child relationship between the first ticket and the second ticket, wherein the first ticket is a parent of the second ticket, and the second ticket is a child of the first ticket; and
storing at least one of the first ticket or the second ticket in association with a reference pointer to the other of the first ticket or the second ticket based on the parent-child relationship.

18. The one or more non-transitory computer-readable media of claim 16, wherein the acts further comprise:

splitting at least the first item from the first ticket to a second ticket and at least one of:

storing the first ticket in association with first split event information, the first split event information including an indication of at least the first item that has been split from the first ticket to the second ticket; or storing the second ticket in association with second split event information, the second split event information including an indication of one or more items that remain on the first ticket after splitting at least the first item from the first ticket to the second ticket.

19. The one or more non-transitory computer-readable media of claim 16, wherein the determining to change the state of the first ticket occurs at least partly in response to receiving an input comprising at least one of:

a save of the first ticket;
a cancel of the first ticket;
a print of the first ticket; or
a close out of the first ticket.

20. The one or more non-transitory computer-readable media of claim 16, wherein the acts further comprise:

splitting at least the first item from the first ticket to a second ticket;

splitting a third item of the set of items from the first ticket to the second ticket;

splitting the third item from the second ticket to a third ticket;

determine that a split ticket session of the UI of the POS device has been canceled;

dismissing, at least partly responsive to the determining that the split ticket session of the UI has been canceled, the second ticket and the third ticket from the UI; and updating, based at least in part on the first foster ticket, the first ticket to include the set of items.

* * * * *